United States Patent
Dahmes

(10) Patent No.: US 11,283,972 B1
(45) Date of Patent: Mar. 22, 2022

(54) CAMERA ENCLOSURE FOR HARSH COMMERCIAL ENVIRONMENTS AND METHOD FOR USING SAME

(71) Applicant: Forrest Lee Dahmes, New London, MN (US)

(72) Inventor: Forrest Lee Dahmes, New London, MN (US)

( * ) Notice: Subject to any disclaimer, the term of this patent is extended or adjusted under 35 U.S.C. 154(b) by 0 days.

(21) Appl. No.: 17/182,020

(22) Filed: Feb. 22, 2021

Related U.S. Application Data

(60) Provisional application No. 63/004,347, filed on Apr. 2, 2020.

(51) Int. Cl.
| | |
|---|---|
| *H04N 5/225* | (2006.01) |
| *G03B 17/02* | (2021.01) |
| *G03B 17/56* | (2021.01) |
| *G03B 17/55* | (2021.01) |
| *G02B 27/00* | (2006.01) |

(52) U.S. Cl.
CPC ..... *H04N 5/22521* (2018.08); *G02B 27/0006* (2013.01); *G03B 17/02* (2013.01); *G03B 17/55* (2013.01); *G03B 17/56* (2013.01); *H04N 5/2252* (2013.01); *H04N 5/2253* (2013.01); *H04N 5/2254* (2013.01)

(58) Field of Classification Search
CPC ........... G01N 21/954; F21W 2131/411; G08B 17/125
See application file for complete search history.

(56) References Cited

U.S. PATENT DOCUMENTS

| | | | | |
|---|---|---|---|---|
| 6,069,652 A | * | 5/2000 | Eversole | H04N 5/2252 348/83 |
| 2007/0125962 A1 | * | 6/2007 | Okabe | H01L 21/67253 250/492.1 |
| 2012/0057018 A1 | * | 3/2012 | Arp | B01J 2/20 348/86 |
| 2012/0287285 A1 | * | 11/2012 | Jensen | F26B 3/12 348/159 |
| 2016/0320122 A1 | * | 11/2016 | Bronsveld | H04N 5/2256 |
| 2017/0171418 A1 | * | 6/2017 | Zhao | G01J 5/028 |
| 2018/0078963 A1 | * | 3/2018 | Fridberg | B01J 2/02 |

* cited by examiner

*Primary Examiner* — Twyler L Haskins
*Assistant Examiner* — Dwight Alex C Tejano
(74) *Attorney, Agent, or Firm* — Gronholm Patent Services

(57) ABSTRACT

Disclosed is an enclosed camera apparatus for use in applications with high temperature and/or airborne powder. The apparatus includes a housing enclosing a camera, with air moving within the housing that cools the camera and pressurizes the housing such that some air expels through a camera outward viewing orifice (aka "camera hole"), such that the camera can look outwardly through the orifice without powder accumulating around and atop the camera lens and/or camera viewing orifice. The camera is held in place by a machined camera mount that centers the camera on the orifice and allows compressed air to pass over the camera and the cable to protect it from overheating. The machined camera mount allows compressed air to pass back through the rest of the housing after it cools the camera to cool the rest of the housing, including the power and signal supply lines of the camera, before it exhausts out the top. Also provided is a wiping apparatus that wipes accumulated powder from atop or around the camera viewing orifice.

19 Claims, 20 Drawing Sheets

MONITORING APPARATUS 100

MONITORING APPARATUS 100

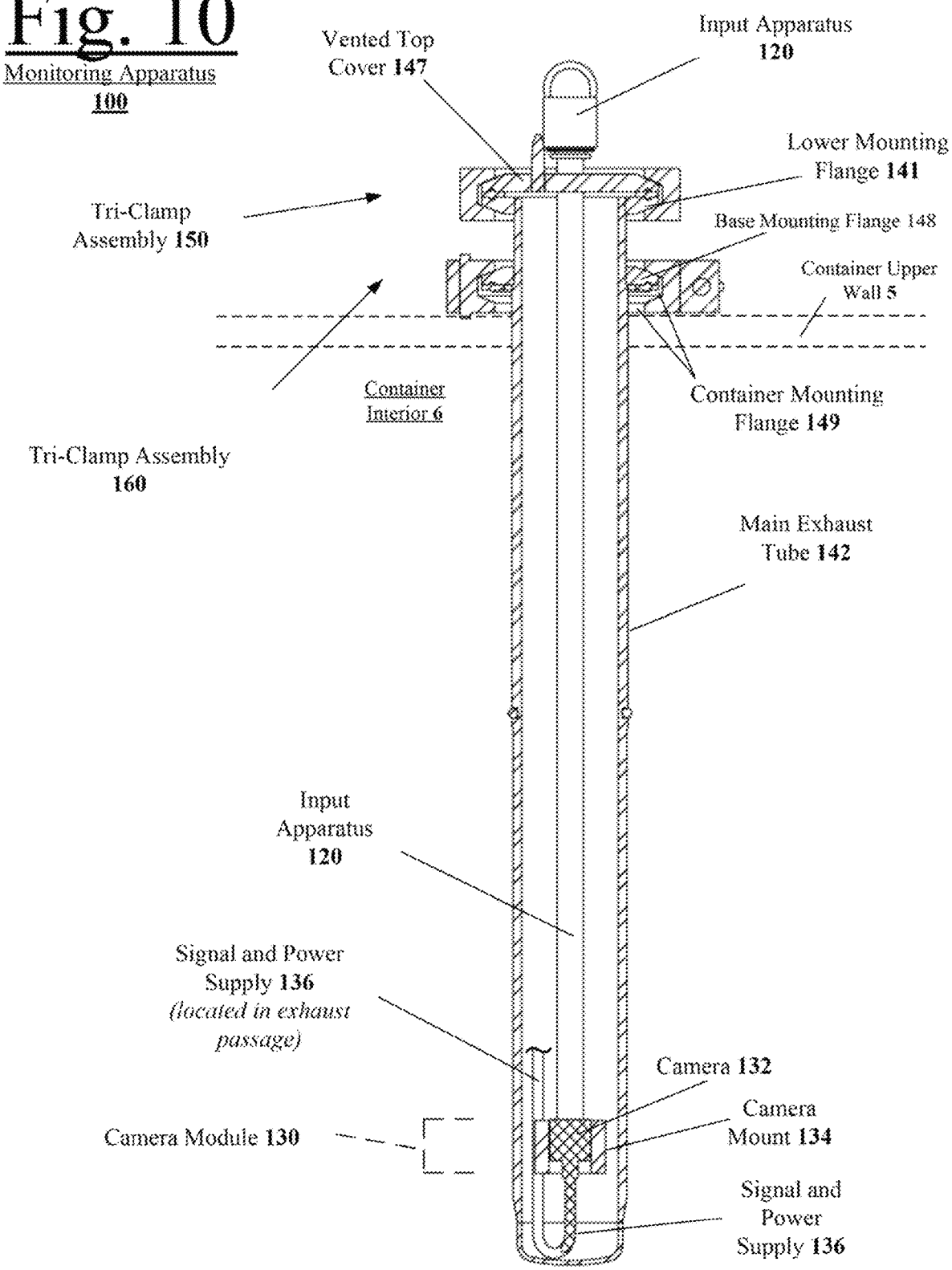

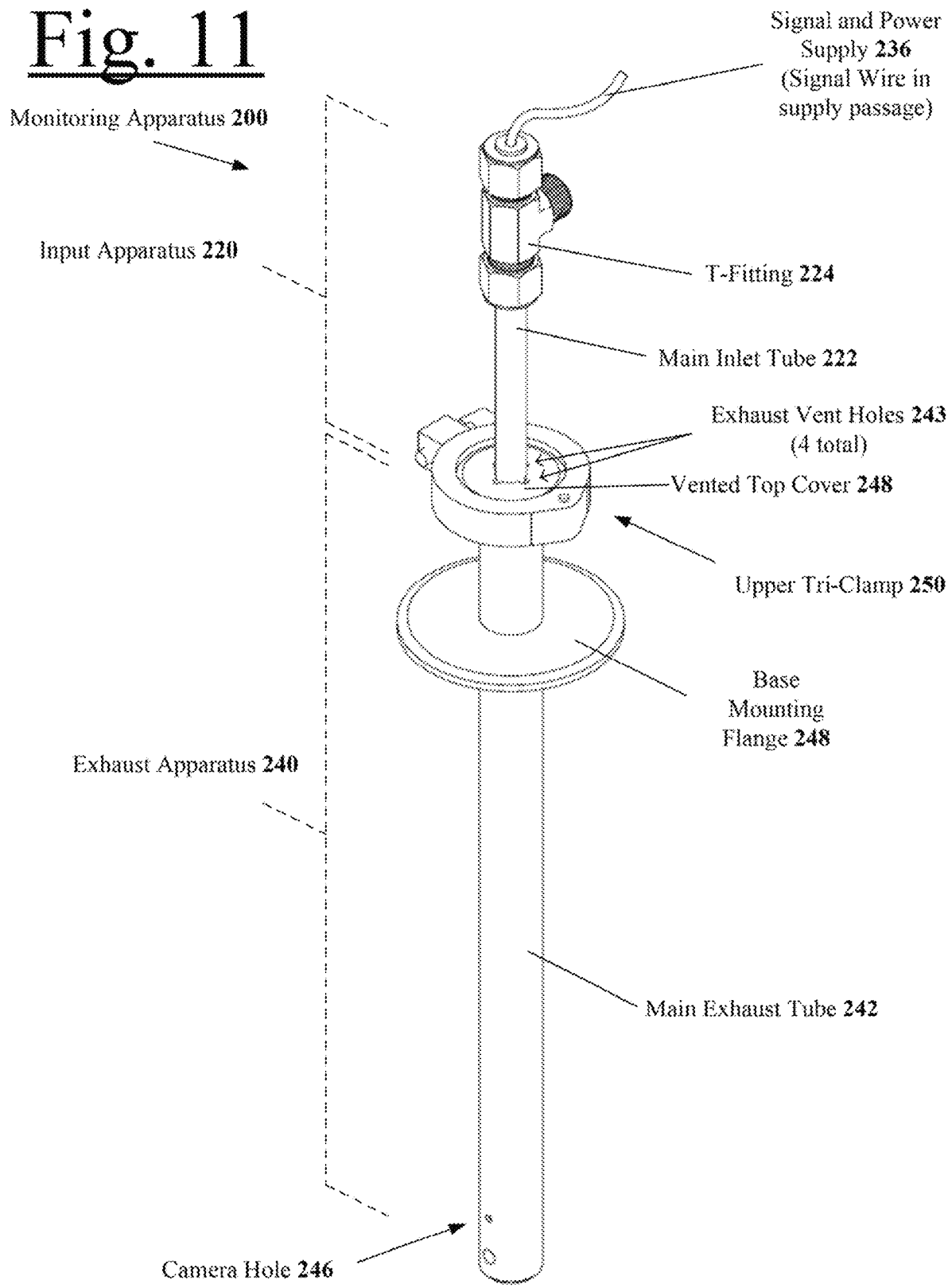

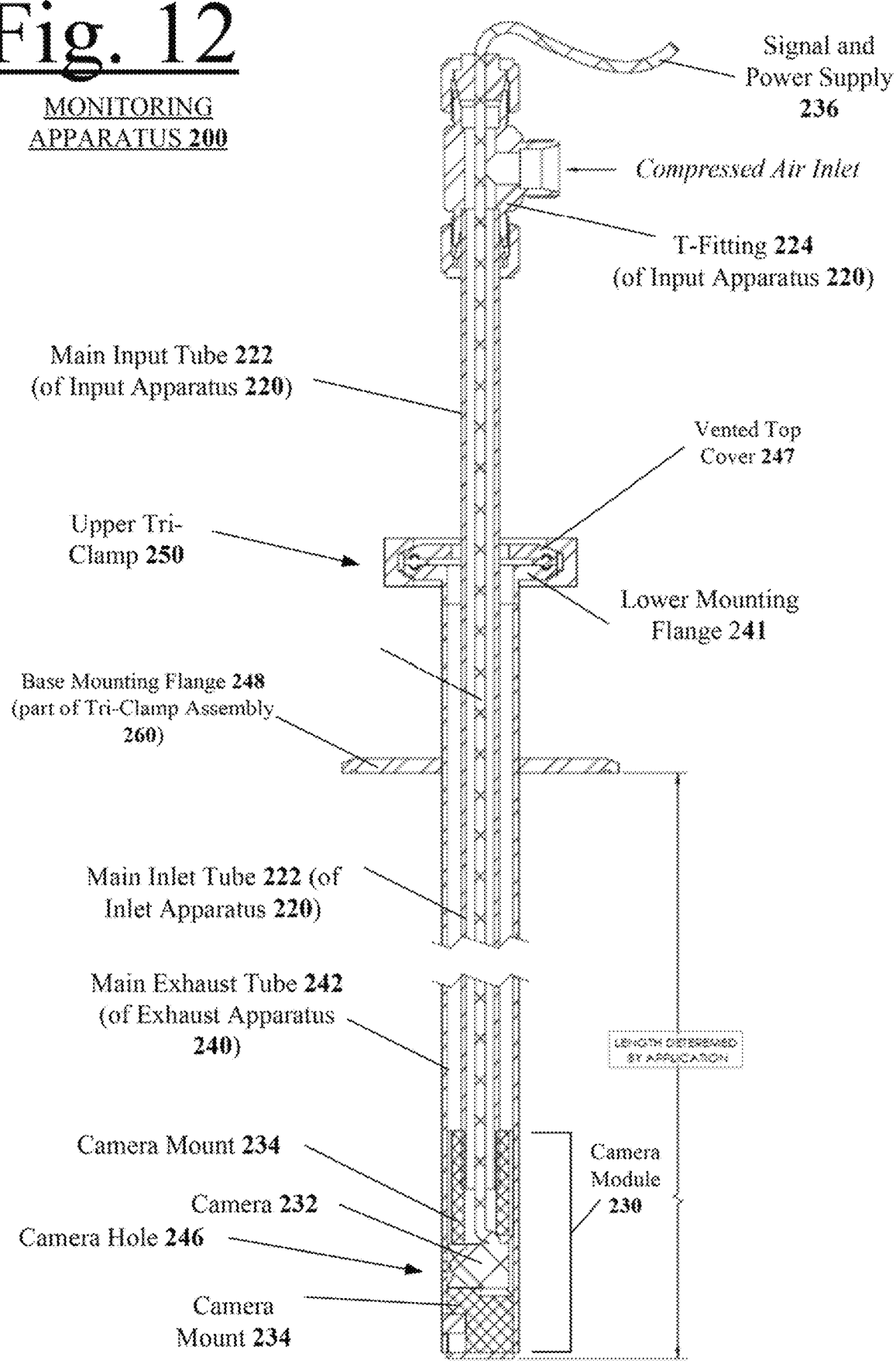

MONITORING APPARATUS 200

MONITORING APPARATUS 200

Illustrative embodiment 400
TOP VIEW

Illustrative embodiment 400
SIDE VIEW

MONITORING APPARATUS 500

MONITORING APPARATUS 400

MONITORING APPARATUS 500

CAMERA ENCLOSURE FOR HARSH COMMERCIAL ENVIRONMENTS AND METHOD FOR USING SAME

CROSS REFERENCE TO RELATED APPLICATION

This application claims the full benefit and priority of provisional application No. 63/004,347, filed Apr. 2, 2020, entitled "CAMERA ENCLOSURE FOR HARSH COMMERCIAL ENVIRONMENTS AND METHOD FOR USING SAME". The entire contents of this application are incorporated herein by reference.

FIELD

This disclosure relates to a camera enclosures for harsh commercial environments, and methods of using same.

Introduction

This section provides some introduction to various matters relating to the invention mentioned herein, but it should be understood that this should not be construed as prior art to the invention; certain materials may be included, referenced, or alluded to in this section that may be inventions of the inventors noted herein. This section is simply included to include some introduction for the sake of the reader, some of which may be background to the invention, and some which is not.

Any reference to background herein is not to be construed as an admission that such art constitutes common general knowledge or "prior art", but instead preliminary discussion used in general to form the basis for the inventions herein.

The use of cameras to monitor commercial processes is commonly known. One challenge is when such cameras are used in harsh environments, including high heat and/or high particulate content such as dust, grit, dirt, abrasive media, dried solids, etc.

For example, in drying processes such as used in spray dryer or fluid bed dryer environments, air is intermixed with a wet solid in an enclosure in order to dry the solid. Applications of such processes include chemical, pharmaceutical, dyestuff, foodstuff, dairy and various other processes. In such processes, it has been found desirable to monitor the drying process by placing monitoring cameras outside the drying enclosure so as to allow an observer outside the enclosure to visually monitor the status and progress of the drying process. This can be helpful in observing buildup and scorching that could lead to fires.

Thus a need has been found to provide an improved camera enclosure to address such needs. Improvements are always needed for camera uses in such situations.

SUMMARY

The present invention relates to an enclosed camera apparatus for use in harsh applications such as those with high temperature and/or airborne powder. The apparatus includes a housing enclosing a camera, with air moving within the housing that cools the camera and pressurizes the housing such that some air expels through a camera outward viewing orifice (aka "camera hole"), such that the camera can look outwardly through the orifice without powder accumulating around and atop the camera lens and/or camera viewing orifice.

The camera is held in place by a machined camera mount that centers the camera on the orifice and allows compressed air to pass over the camera and the cable to protect it from overheating. The machined camera mount allows compressed air to pass back through the rest of the housing after it cools the camera to cool the rest of the housing, including the power and signal supply lines of the camera, before the air exhausts out the top.

Also provided is a wiping apparatus that wipes accumulated powder from atop or around the camera viewing orifice.

Therefore, it is an object of the present invention to provide a device for monitoring the inside of a drying enclosure, said drying enclosure having an environment including suspended particulate matter suspended in air at a first air pressure, said device and comprising: A) a camera enclosure configured to be placed at least partially within said drying enclosure, said camera enclosure comprising at least one or more containing walls, and also comprising a camera mount, said walls combining to define an inlet port to accept air into said camera enclosure at said second air pressure, said walls also combining to define an internal camera assembly cavity configured to contain and maintain air therein at said second air pressure being higher than said first air pressure, said walls also combining to define a camera viewing port configured to allow for a flow of air out of said camera assembly cavity and into said drying enclosure, when said air within said camera enclosure is at said second air pressure, said camera mount being within said camera enclosure; and B) a camera assembly including a viewing lens directed along a viewing axis and configured to view a viewing field, said camera assembly being mounted relative to said camera mount of said camera enclosure such that said viewing axis extends through said camera viewing port of said camera enclosure, and said viewing field includes at least a portion of said inside of said drying enclosure, said camera enclosure and said camera assembly connected and configured such that air within said camera assembly cavity at said second air pressure may exit said camera assembly cavity through said camera viewing port, thus discouraging particulate matter from obstructing said camera viewing port and from obstructing said viewing field of said camera assembly.

It is a further object of the present invention to provide a device for monitoring the inside of a drying enclosure as set forth above, wherein said camera enclosure at least partially defines a passageway configured to allow for said air contained within said camera assembly cavity at said second air pressure to move along a path to provide a cooling effect for said camera.

It is a further object of the present invention to provide a device for monitoring the inside of a drying enclosure as set forth above, wherein said camera assembly further comprises a signal line for transmitting signal from said camera to a remote receiving location, wherein said camera assembly further comprises a power supply for providing power to said camera assembly from a remote location, and wherein said camera enclosure at least partially defines a passageway configured to allow for said air contained within said camera assembly cavity at said second air pressure to move along a path to providing cooling of one of said signal line and power supply.

It is a further object of the present invention to provide a device for monitoring the inside of a drying enclosure as set forth above, wherein said inlet port of said camera enclosure is configured to be attached to a high air pressure line providing air at said second air pressure.

It is a further object of the present invention to provide a device for monitoring the inside of a drying enclosure as set forth above, wherein said inlet port of said camera enclosure is configured to be attached to a high air pressure pump providing air at said second air pressure.

It is a further object of the present invention to provide a device for monitoring the inside of a drying enclosure as set forth above, further comprising a high air pressure pump providing air at said second air pressure, and wherein said inlet port of said camera enclosure is attached to a high air pressure pump providing air at said second air pressure.

It is a further object of the present invention to provide a device for monitoring the inside of a drying enclosure as set forth above, wherein said camera enclosure at least partially defines a passageway configured to allow for said air contained within said camera assembly cavity at said second air pressure to move along a path to exit said camera enclosure at a location separate from that of said camera viewing port.

It is a further object of the present invention to provide a device for monitoring the inside of a drying enclosure as set forth above, wherein said camera enclosure at least partially defines a passageway configured to allow for said air contained within said camera assembly cavity at said second air pressure to move along a path to exit said camera enclosure at a location separate from that of said camera viewing port, said passageway provided by the use of two concentric tube assemblies, an inner inlet tube assembly and an outer exhaust tube assembly, in which air first passes through said inlet tube assembly in one direction, and then exhausted through said exhaust tube assembly along a second, opposing direction, and wherein said camera mount is mounted relative to said inlet tube assembly.

It is a further object of the present invention to provide a device for monitoring the inside of a drying enclosure, said drying enclosure having an environment including suspended particulate matter suspended in air at a first air pressure, said device comprising: A) a camera enclosure configured to be placed at least partially within said drying enclosure, said camera enclosure comprising at least one or more containing walls, and also comprising a camera mount, said walls combining to define an inlet port to accept air into said camera enclosure at said second air pressure, said walls also combining to define an internal camera assembly cavity configured to contain air therein at said second air pressure being higher than said first air pressure, said walls also combining to define a camera viewing port configured to allow for a flow of air out of said camera assembly cavity and into said drying enclosure, when said air within said camera enclosure is at said second air pressure, said camera mount being within said camera enclosure; B) a camera assembly including a viewing lens directed along a viewing axis and configured to view a viewing field, said camera assembly being mounted relative to said camera mount of said camera enclosure such that said viewing axis extends through said camera viewing port of said camera enclosure, and said viewing field includes at least a portion of said inside of said drying enclosure, said camera enclosure and said camera assembly connected and configured such that air contained within said camera assembly cavity at said second air pressure may exit said camera assembly cavity through said camera viewing port, thus discouraging particulate matter from obstructing said camera viewing port and from obstructing said viewing field of said camera assembly; and C) a wiper assembly including a wiper blade configured to wipe particulate matter from the outside of said camera enclosure proximate the camera viewing port to assist in clearing particulate matter from said camera viewing field.

It is a further object of the present invention to provide a method for monitoring the inside of a drying enclosure, said drying enclosure having an environment including suspended particulate matter suspended in air at a first air pressure, said method comprising: A) providing a camera enclosure for containing a camera therein, said camera enclosure defining an internal camera assembly cavity configured to contain air therein at said second air pressure being higher than said first air pressure; B) positioning a camera assembly within said camera assembly cavity, such that said camera lens includes a field of view passing through said camera viewing port and into said inside of said drying enclosure, such that said camera can monitor at least part of said drying enclosure; and C) introducing air into said camera enclosure at a pressure higher than said first air pressure, such that said camera assembly cavity is maintained at said second air pressure such that at least a part of said air introduced into said camera enclosure subsequently passes out of said camera viewing port, said flow out of said viewing port tending to discourage accumulation of particulate matter within said viewing port and thus tending to clear said particulate matter from said field of view of said camera.

It is a further object of the present invention to provide a method for monitoring the inside of a drying enclosure as set forth above, wherein said camera enclosure at least partially defined a passageway configured to allow for cooling of the camera.

It is a further object of the present invention to provide a method for monitoring the inside of a drying enclosure as set forth above, wherein said camera assembly further comprises a signal line for transmitting signal from said camera to a remote receiving location, wherein said camera assembly further comprises a power supply for providing power to said camera assembly from a remote location, and wherein said camera enclosure at least partially defines a passageway configured to allow for said air contained within said camera assembly cavity at said second air pressure to move along a path to providing cooling of one of said signal line and power supply.

It is a further object of the present invention to provide a method for monitoring the inside of a drying enclosure as set forth above, wherein said inlet port of said camera enclosure is configured to be attached to a high air pressure line providing air at said second air pressure.

It is a further object of the present invention to provide a method for monitoring the inside of a drying enclosure as set forth above, wherein said inlet port of said camera enclosure is configured to be attached to a high air pressure pump providing air at said second air pressure.

It is a further object of the present invention to provide a method for monitoring the inside of a drying enclosure as set forth above, further comprising a high air pressure pump providing air at said second air pressure, and wherein said inlet port of said camera enclosure is attached to a high air pressure pump providing air at said second air pressure.

It is a further object of the present invention to provide a method for monitoring the inside of a drying enclosure as set forth above, wherein said camera enclosure at least partially defines a passageway configured to allow for said air contained within said camera assembly cavity at said second air pressure to move along a path to exit said camera enclosure at a location separate from that of said camera viewing port.

It is a further object of the present invention to provide a method for monitoring the inside of a drying enclosure as set forth above, wherein said camera enclosure further comprises a wiper assembly including a wiper blade configured to wipe particulate matter from the outside of said camera enclosure proximate the camera viewing port to assist in clearing particulate matter from said camera viewing field, and wherein said method further comprises operation of said wiper assembly such that its wiper blade wipes particulate matter from the outside of said camera.

It is a further object of the present invention to provide a method for monitoring the inside of a drying enclosure as set forth above, wherein said camera enclosure at least partially defines a passageway configured to allow for said air contained within said camera assembly cavity at said second air pressure to move along a path to exit said camera enclosure at a location separate from that of said camera viewing port, said passageway provided by the use of two concentric tube assemblies, an inner inlet tube assembly and an outer exhaust tube assembly, in which air first passes through said inlet tube assembly in one direction, and then exhausted through said exhaust tube assembly along a second, opposing direction, wherein said camera mount is mounted relative to said inlet tube assembly, and wherein step C causes air to first pass through said inlet tube assembly in said one direction, and then be exhausted through said exhaust tube assembly along said second, opposing direction.

It is a further object of the present invention to provide a method for monitoring the inside of a drying enclosure as set forth above, wherein said method further comprises viewing and monitoring said inside of said drying enclosure with said camera.

These and other aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 10 shows a side cross sectional view of a part of the embodiment 100, viewing along the cross section A-A of FIG. 4.

FIG. 11 shows a pictorial view of an embodiment 200 according to one aspect of the invention.

FIG. 12 shows a side cross sectional view of an embodiment 200 according to one aspect of the invention viewing along the cross section A-A of FIG. 13.

DETAILED DESCRIPTION

Introduction

Figure 1:
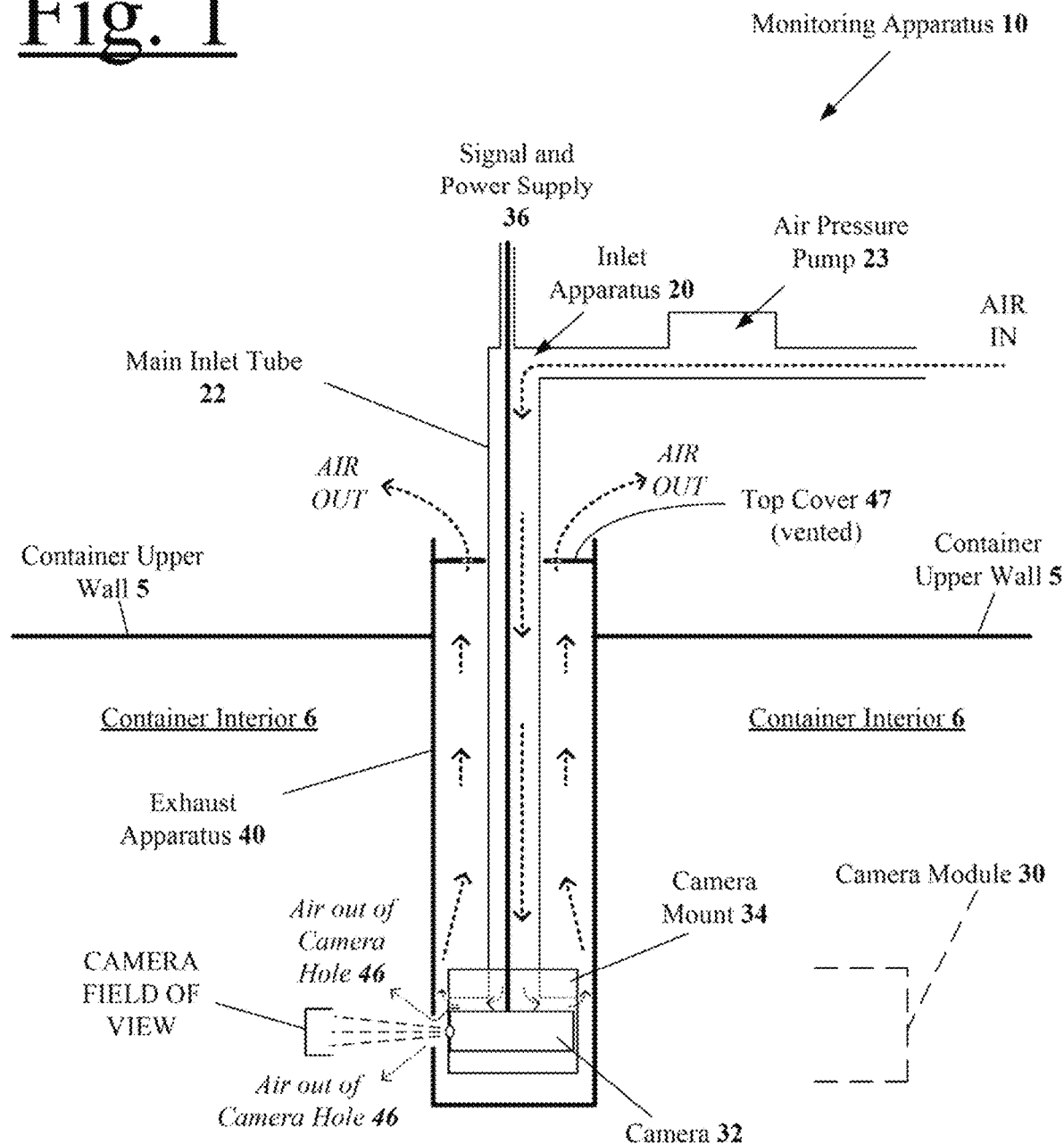
FIG. 1 shows an illustrative side sectional view of a simplified embodiment 10 according to one aspect of the invention.

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of the various elements:
5 Container upper wall
6 Container interior
10 Monitoring Apparatus
20 Inlet Apparatus
22 Main Inlet tube
23 Air Pressure Pump
30 Camera Module
32 Camera
34 Camera mount
36 Signal and power supply wiring
40 Exhaust Apparatus
46 camera hole
47 top cover
100 Monitoring Apparatus
120 Inlet Apparatus
126 Inlet apparatus flange 130 Camera Module
132 Camera
134 Camera mount
136 Signal and power supply wiring
137 Set Screw
140 Exhaust Apparatus
141 lower mounting flange (lower part of upper Tri-Clamp 150)
142 main exhaust tube
143 exhaust port
144 side wall
145 bottom end
146 camera hole
147 vented top cover (lower part of upper Tri-Clamp 150)
148 base mounting flange (upper part of lower Tri-Clamp 160)
149 container mounting flange (lower part of lower Tri-Clamp 160)
150 Upper Tri-Clamp
160 Lower Tri-Clamp
200 Monitoring Apparatus
220 Inlet Apparatus
222 Main Inlet Tube
224 T-Fitting
230 Camera Module
232 Camera
234 Camera mount
236 Signal and power supply
238 Front return groove
239 Rear return groove
240 Exhaust Apparatus
241 Lower Mounting Flange (upper clamp)
242 Main exhaust tube
246 Camera hole
247 vented top cover (lower part of upper Tri-Clamp 250)
248 base mounting flange (upper part of lower Tri-Clamp 260)
249 container mounting flange (lower part of lower Tri-Clamp 260)
250 Upper Tri-Clamp
260 Lower Tri-Clamp
300 Monitoring Apparatus
322 Main input tube
332 Camera
334 Camera mount
336 Signal and power supply
342 Main exhaust tube
346 camera hole
400 Monitoring Apparatus
432 Camera
442 Main exhaust tube
446 camera hole
470 Wiper
471 Wiper Mount
472 Wiper Axis
500 Monitoring Apparatus
570 Wiper
572 Drive Shaft
573 Rotary Actuator

DETAILED DISCUSSION

Basic Operation and Construction

The present invention relates to an enclosed camera apparatus for use in applications such as those with high temperature and/or airborne powder. The apparatus includes a housing enclosing a camera, with air moving within the housing that cools the camera and pressurizes the housing such that some air continuously expels through a camera outward viewing orifice (aka "camera hole"), such that the camera can look outwardly through the orifice without powder accumulating around and atop the camera lens and/or camera viewing orifice.

The camera is held in place by a machined camera mount that centers the camera on the orifice and allows compressed air to pass over the camera and the cable to protect it from overheating. The machined camera mount allows compressed air to pass back through the rest of the housing after it cools the camera to cool the rest of the housing, including the power and signal supply lines of the camera, before it exhausts out the top.

Also provided is a wiping apparatus that wipes accumulated powder from atop or around the outside of the camera viewing orifice, by the use of a wiper moving in a periodic back-and-forth movement across the path of the camera line of sight.

Embodiment 10

Figure 2:
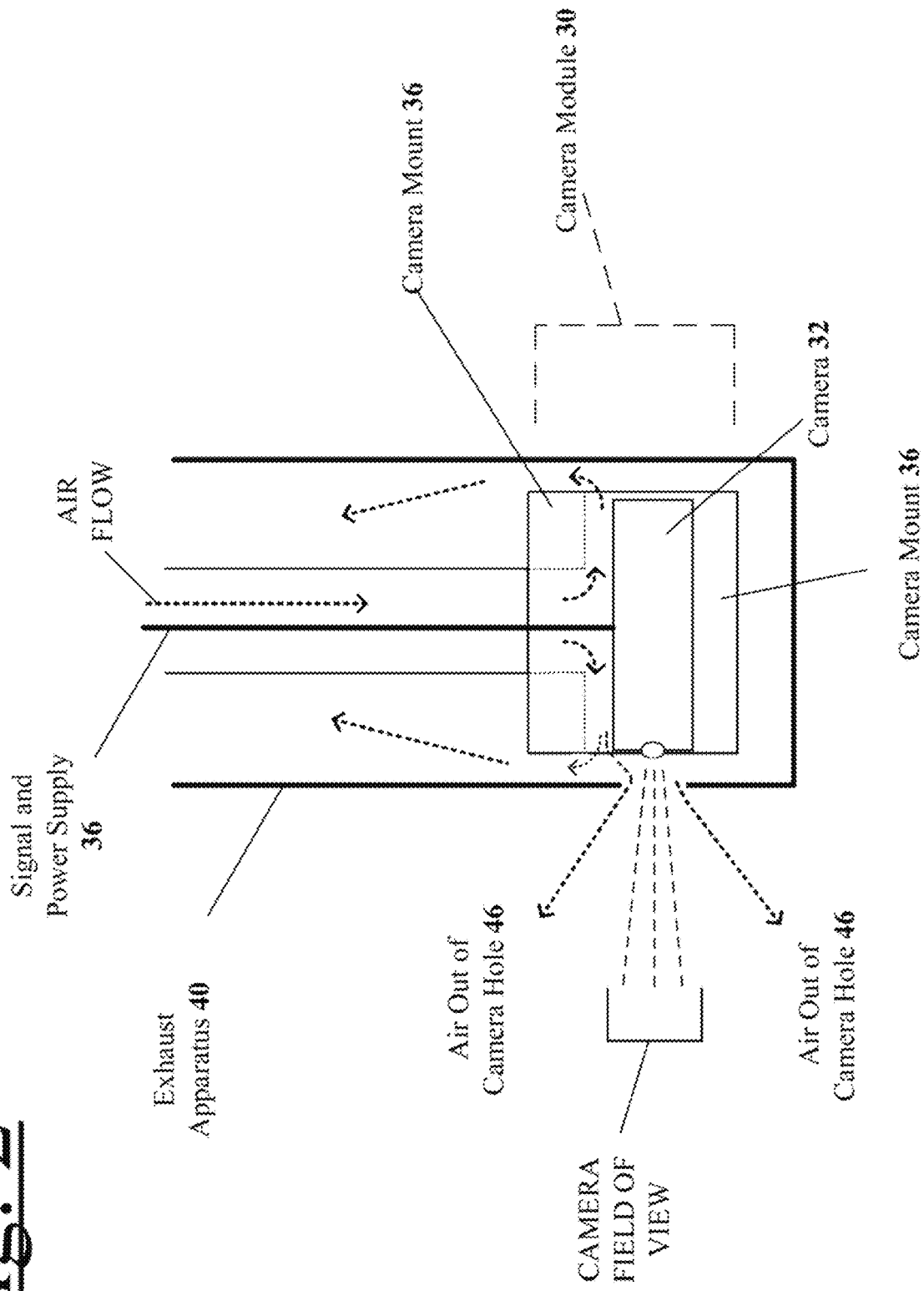
FIG. 2 is a more detailed view of a part of FIG. 1.

Reference is now made to FIGS. 1 and 2, which illustrate a Monitoring Apparatus 10 embodiment of the invention.

This Monitoring Apparatus 10 includes the following elements and features:
  5 Container upper wall
  6 Container interior
  10 Monitoring Apparatus
  20 Inlet Apparatus
  22 Main Inlet tube
  30 Camera Module
  32 Camera
  34 Camera mount
  36 Signal and power supply wiring
  40 Exhaust Apparatus
  46 camera hole
  47 top cover The monitoring apparatus 10 basic elements include an inlet apparatus 20, camera module 30, and an exhaust apparatus 40. The camera module 30 is attached to the lower end of the inlet apparatus 20, and is located within the exhaust apparatus 40. Pressurized air is introduced into the inlet apparatus 20, which causes a predetermined air flow, such that the air then passes down through and adjacent the camera module 30, and then either passes out of a camera hole 46 in the exhaust apparatus, or passes back up the exhaust apparatus 40 and out of the top of the exhaust apparatus.

The overall apparatus 10 is mounted relative to a container having a container upper wall 5, and surrounding a container interior 6. In one configuration this container interior is a drying environment such as a spray dryer or fluid bed dryer.

The inlet apparatus 20 is generally tubular, and configured to accept pressurized air through its main inlet tube 22, which is supplied with compressed air through a conventional means such as air pressure pump 23 or as disclosed in more detail elsewhere. The main inlet tube 22 is generally tubular and includes a longitudinal axis which is vertical in this version, although other configurations are possible.

The camera module 30 is mounted at the lower end of the main inlet tube 22. The camera module 30 includes a conventional camera 32 which is mounted within the camera mount 36, which mounts the camera 32 in a relatively stationary position relative to the inlet apparatus 20. The camera module 30 is shaped such that air passages are provided around the camera 32 between the camera 32 and the module 30, such that at least some of the air coming from the main inlet tube 22 can pass alongside the camera 32 and provide a cooling function.

The camera 32 is supplied with external power and is connected to a signal line by a signal and power supply 36, which in this configuration passes through the main inlet tube 22, from a path beginning at the outside of the tube 22, into the upper end of the tube 22, and finally ending at the camera 32.

The exhaust apparatus 40 includes a camera hole 46 and a vented top cover 47. The exhaust apparatus 40 accepts air from the inlet apparatus 20 and diverts it either out the camera hole 46, or up alongside the inlet apparatus 20 and out its top cover 47.

The air exhausting out the camera hole 46 is supplied at a suitable volume so as to provide a "clearing effect" by blowing away any particulate matter which may tend to accumulate atop or alongside the camera hole 46.

The air path as is generally shown in the dotted lines of FIGS. 1 and 2. The air enters the main inlet tube 22, passes down the main inlet tube towards the camera module 30, and then passes adjacent to the camera 32. Part of the air then exits the camera hole 46 and into the container interior 6, providing a "hole clearing" function of keeping particulates out of the camera field of view. Another part of the air passes upwardly outside of the main inlet tube 22, but inside the main generally tubular exhaust apparatus 40, until it exits out of the top cover 47 of the exhaust apparatus 40, which is above the container upper wall 5 and outside the container interior 6.

Embodiment 100

Reference is now made to FIGS. 3-10, which illustrate a Monitoring Apparatus 100 embodiment of the invention.

This monitoring apparatus 100 includes the following elements and features:
- 100 Monitoring Apparatus
- 120 Inlet Apparatus
- 126 Inlet apparatus flange
- 130 Camera Module
- 132 Camera
- 134 Camera mount
- 136 Signal and power supply wiring
- 137 Set Screw
- 140 Exhaust Apparatus
- 141 lower mounting flange (lower part of upper Tri-Clamp 150)
- 142 main exhaust tube
- 143 exhaust port
- 144 side wall
- 145 bottom end
- 146 camera hole
- 147 vented top cover (lower part of upper Tri-Clamp 150)
- 148 base mounting flange (upper part of lower Tri-Clamp 160)
- 149 container mounting flange (lower part of lower Tri-Clamp 160)
- 150 Upper Tri-Clamp
- 160 Lower Tri-Clamp The monitoring apparatus 100 basic elements include an inlet apparatus 120, camera module 130, and an exhaust apparatus 140. The camera module 130 is attached to the lower end of the inlet apparatus 120, and is located within the exhaust apparatus 140. Pressurized air is introduced into the inlet apparatus 120, which causes a predetermined air flow, such that the air then passes down through and adjacent the camera module 130, and then either passes out of a camera hole 146 in the exhaust apparatus, or passes back up the exhaust apparatus 140 and out of the top of the exhaust apparatus.

Figure 3:
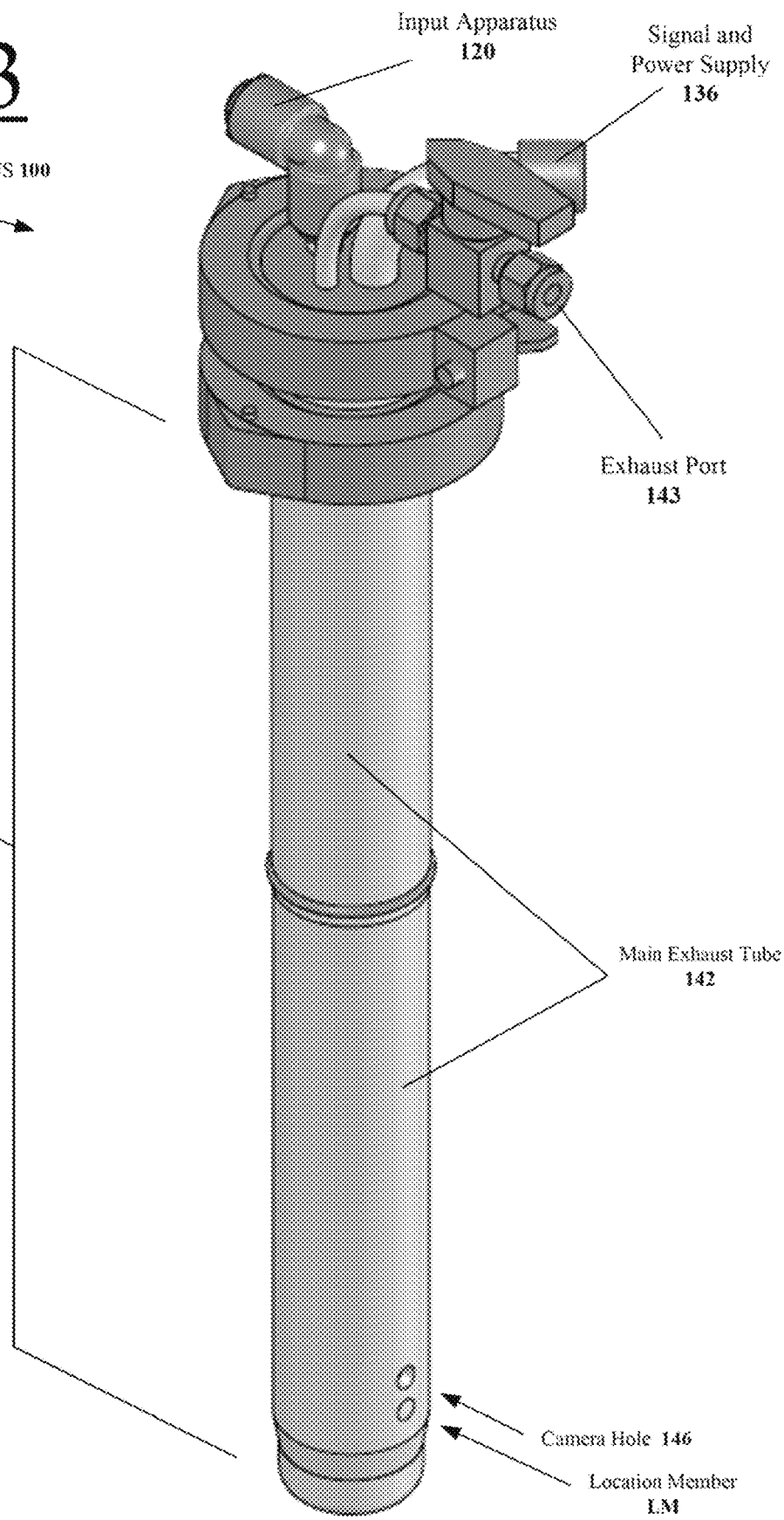
FIG. 3 shows a pictorial view of an embodiment 100 according to one aspect of the invention.
Figure 4:
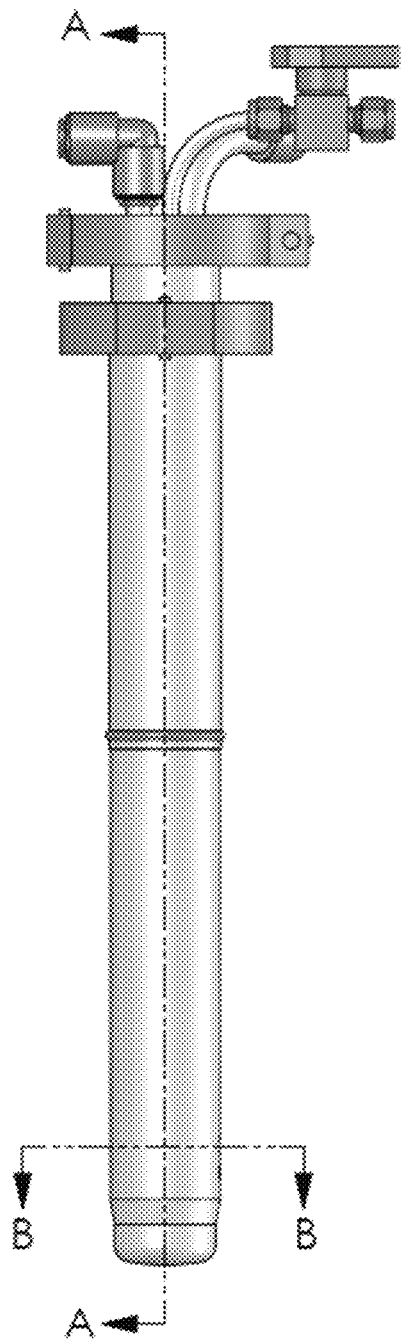
FIG. 4 shows a side view of an embodiment 100 according to one aspect of the invention.
Figure 5:
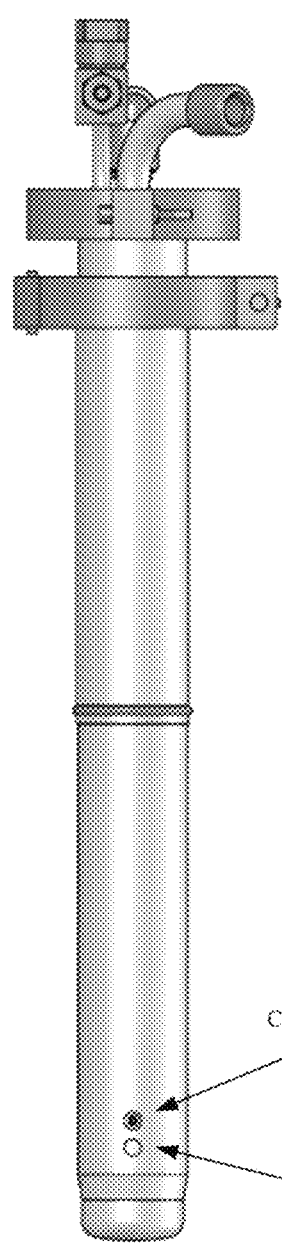
FIG. 5 shows another side view of an embodiment 100 according to one aspect of the invention.

The inlet apparatus 120 is generally tubular, and configured to accept pressurized air through a conventional means as disclosed in more detail elsewhere. The main inlet tube 120 is generally tubular (with the exception of an L-shaped connector at its top such as shown in FIG. 3) and its main body includes a longitudinal axis which is vertical in this version, although other configurations are possible.

The camera module 130 (see particularly FIGS. 6 and 10) is mounted at the lower end of the main inlet tube 122. The camera module 130 includes a conventional camera 132 which is mounted within the camera mount 136 (via a set screw 137), which mounts the camera 132 in a relatively stationary position relative to the inlet apparatus 120. The camera module 130 is shaped such that air passages are provided around the camera 132 between the camera 132 and the camera mount 134, such that at least some of the air coming from the main inlet tube 122 can pass alongside the camera 132 and provide a cooling function.

The camera 132 is supplied with external power and is connected to a signal line by a signal and power supply 136, which in this configuration passes through the top cover 147, into the main exhaust tube 142 (and outside of the inlet tube 122), down the main exhaust tube 122, and curling up as shown in FIG. 10 as it comes under and into the camera 132.

The exhaust apparatus 140 includes a main exhaust tube 142 having a vented top cover 147. Attached to the main exhaust tube is a base mounting flange 148 discussed elsewhere. The main exhaust tube 142 is substantially cylindrical, and includes an exhaust port 143, cylindrical side wall 144 (defining a camera hole 146), and a bottom end 145.

The exhaust apparatus 140 accepts air from the inlet apparatus 120 and diverts it either out the camera hole 146, or up alongside the inlet apparatus 120 and out its vented top cover 147, such that said air is vented to the atmosphere.

The air exhausting out the camera hole 146 is supplied at a suitable volume so as to provide a "clearing effect" by blowing away any particulate matter which may tend to accumulate atop or alongside the camera hole 146.

The air path as is follows. The air enters the main inlet apparatus 120, passes down towards the camera module 130, and then passes adjacent to the camera 132, providing a cooling effect. Part of the air then exits the camera hole 146 (see FIG. 5) and into the container interior 6, providing a "hole clearing" function of keeping particulates out of the camera field of view. Another part of the air passes upwardly outside of the main inlet tube 122, but inside the main generally tubular exhaust apparatus 140, until it exits out of the top cover 147 of the exhaust apparatus 40, via the exhaust port 143, which has its outlet above the container upper wall 5 and outside the container interior 6.

The upper Tri-Clamp assembly 150 allows for the inlet apparatus 120 to be detachably mounted relative to the exhaust apparatus 140, using a conventional tri-clamp configuration in which an upper flange/ferrule is attached to a lower flange/ferrule by use of a clamp connecting the two flanges and sealing an air passageway passing through a hole in each of the two flanges.

Referring now particularly to FIG. 10, the upper flange of the Tri-Clamp assembly 150 is the vented top cover 147 of the exhaust apparatus 140, and the lower flange of the Tri-Clamp assembly 150 is the lower mounting flange 141.

The upper flange of the lower Tri-Clamp assembly 160 is the base mounting flange 148 (which is rigidly attached to the exterior of the main exhaust tube 142), and the lower flange of the Tri-Clamp assembly 160 is the container mounting flange 149 (which is rigidly attached to the container upper wall 5).

Figure 6:
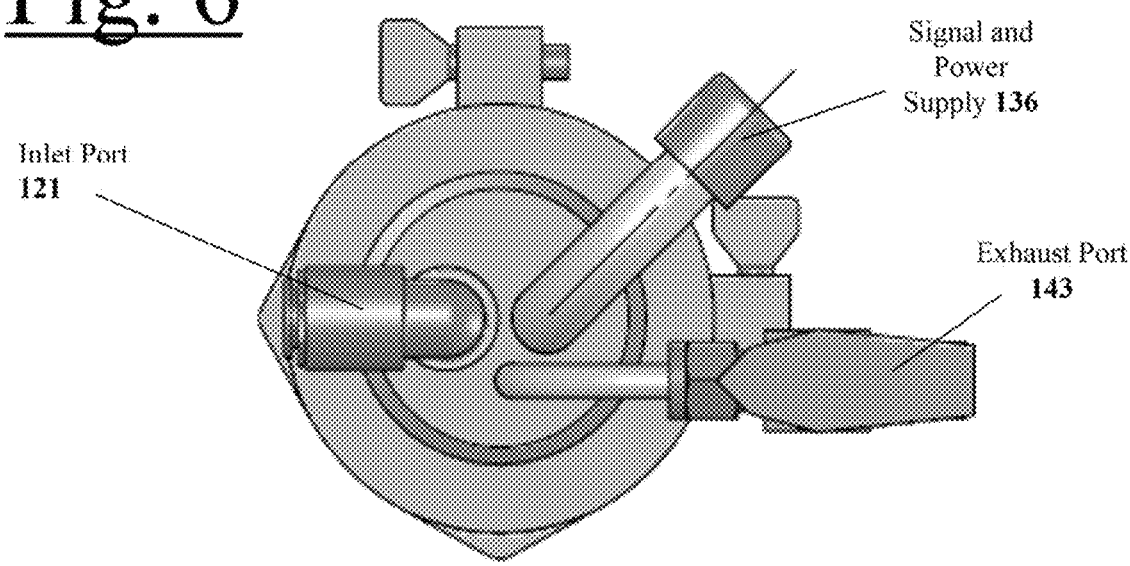
FIG. 6 shows a top view of an embodiment 100 according to one aspect of the invention.
Figure 7:
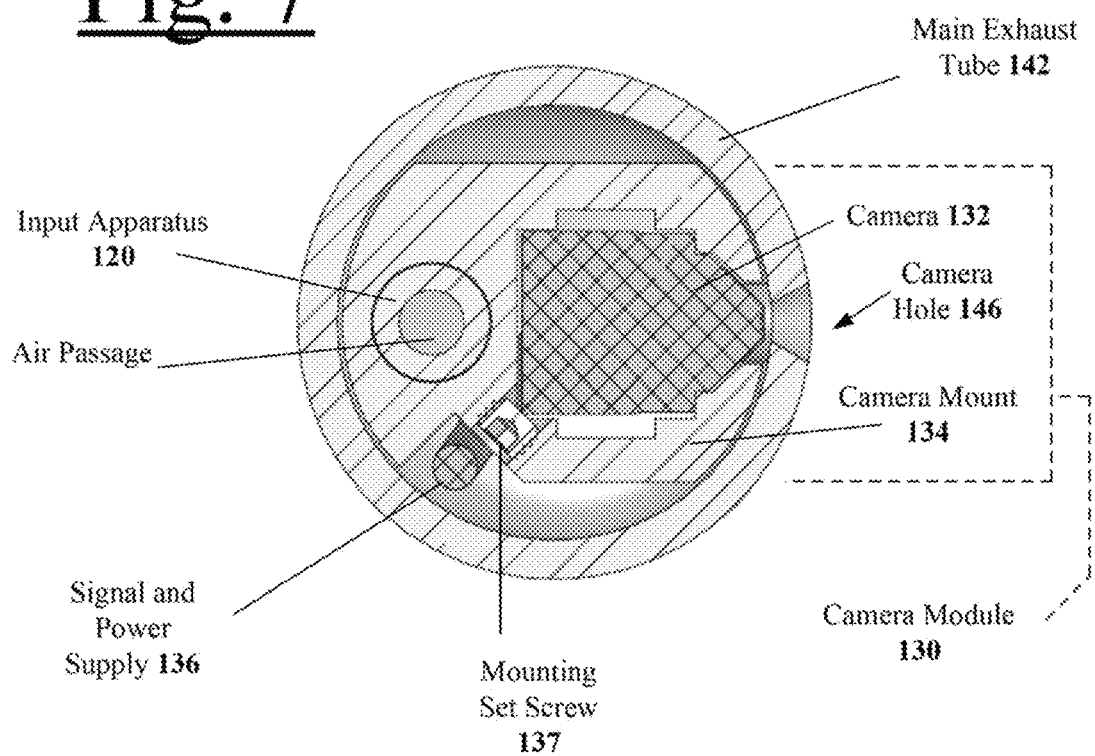
FIG. 7 shows a bottom cross sectional view of an embodiment 100 according to one aspect of the invention, viewing along the cross section B-B of FIG. 4.
Figure 9:
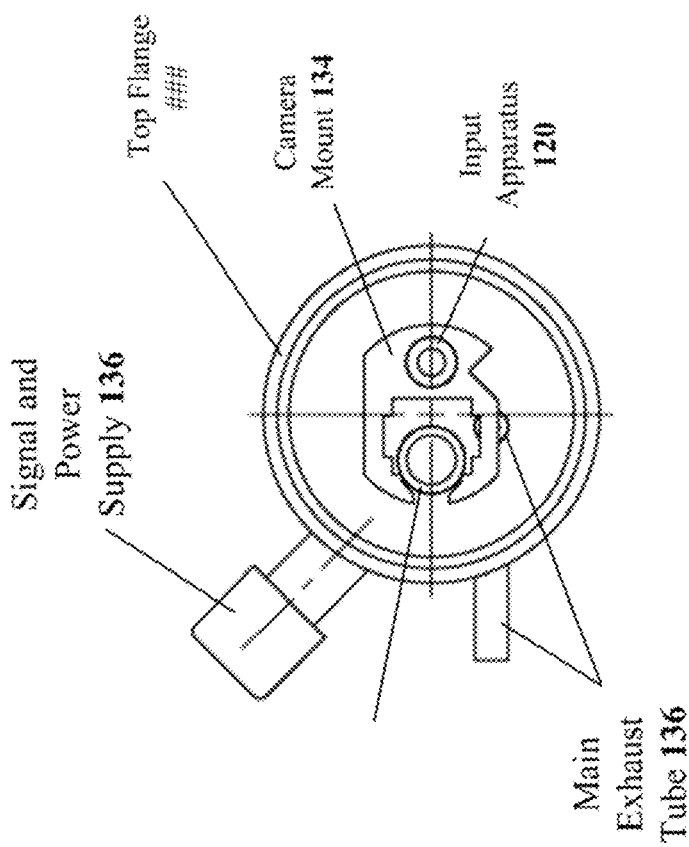
FIG. 9 shows a bottom isolated view of a part of the embodiment 100, viewing along line A7-A7 of FIG. 8.
Figure 8:
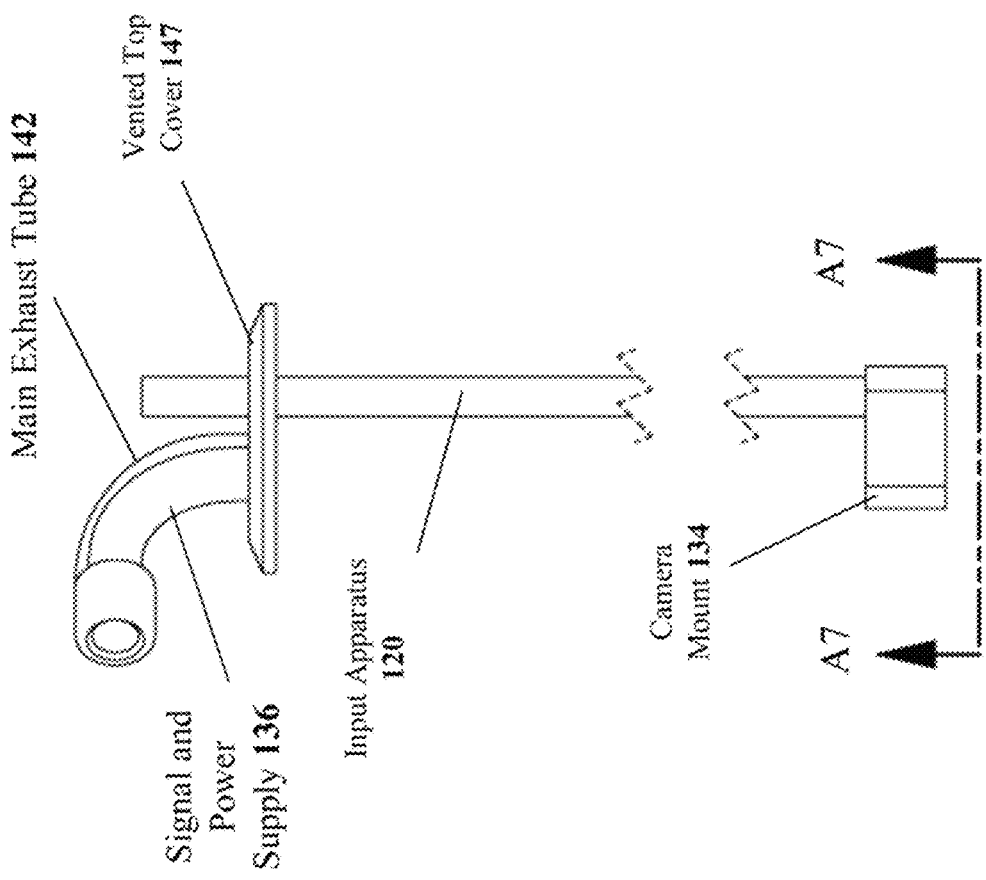
FIG. 8 shows a side isolated view of a part of the embodiment 100.
Figure 13:
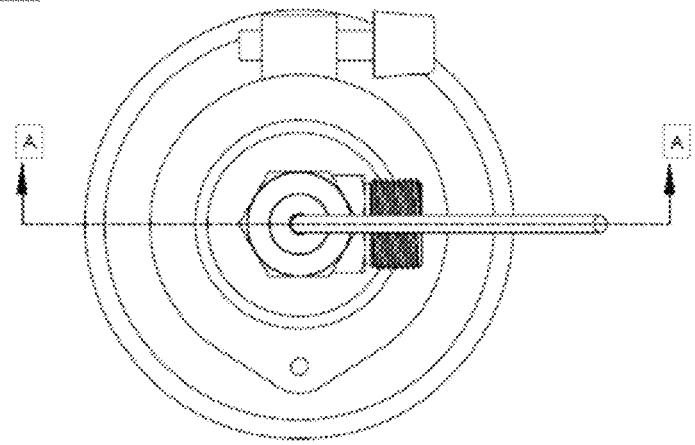
FIG. 13 shows a top view of an embodiment 200 according to one aspect of the invention.

The vented top cover 147 of the exhaust apparatus 140 is "vented", in that it allows air within the main exhaust tube 142 to vent to the atmosphere through an exhaust port 143 (see FIG. 6). The extent and volume of said venting may be controlled by a valve in this exhaust port. It may also be understood that the top cover supports the upper end of the inlet apparatus 120, and likewise provides support for and passage therethrough of the signal and power supply 136.

Note that there is a location member LM shown in FIG. 3, which is just below the camera hole. This is to allow the use of a locating member, such as a screw, which can engage the wall of the exhaust tube as well as a corresponding hole or notch in the camera mount, so as to provide both stability as well as alignment and proper location of the camera mount (and thus the camera) inside the exhaust apparatus 140.

Embodiment 200

Reference is now made to FIGS. 11-19, which illustrate a Monitoring Apparatus 200 embodiment of the invention.

This monitoring apparatus 200 includes the following elements and features:
- 200 Monitoring Apparatus
- 220 Inlet Apparatus
- 222 Main Inlet Tube
- 224 T-Fitting
- 230 Camera Module
- 232 Camera
- 234 Camera mount
- 236 Signal and power supply
- 238 Front return groove
- 239 Rear return groove
- 240 Exhaust Apparatus
- 241 Lower Mounting Flange (upper clamp)
- 242 Main exhaust tube
- 246 Camera hole
- 247 vented top cover (lower part of upper Tri-Clamp 250)
- 248 base mounting flange (upper part of lower Tri-Clamp 260)
- 249 container mounting flange (lower part of lower Tri-Clamp 260)
- 250 Upper Tri-Clamp
- 260 Lower Tri-Clamp The monitoring apparatus 200 basic elements include an inlet apparatus 220, camera module 230, and an exhaust apparatus 240. The camera module 230 is attached to the lower end of the inlet apparatus 220, and is located within the exhaust apparatus 240. Pressurized air is introduced into the inlet apparatus 220, which causes a predetermined air flow, such that the air then passes down through and adjacent the camera module 230, and then either passes out of a camera hole 246 in the exhaust apparatus, or passes back up the exhaust apparatus 240 and out of the top of the exhaust apparatus.

The inlet apparatus 220 is generally tubular, and configured to accept pressurized air through a conventional means as disclosed in more detail elsewhere. The main inlet tube 220 is generally tubular (with the exception of the use of a T-fitting 224 at its top such as shown in FIG. 12) and its main inlet tube 222 includes a longitudinal axis which is vertical in this version, although other configurations are possible.

The camera module 230 (see for example FIGS. 12 and 14) is mounted at the lower end of the main inlet tube 222. The camera module 230 includes a conventional camera 232 which is mounted within the camera mount 234 (via a set location member LM such as a welded in place peg—see FIG. 14), which mounts the camera 232 in a relatively stationary position relative to the inlet apparatus 220. The camera module 230 is shaped such that air passages are provided around the camera 232 between the camera 232 and the camera mount 234, such that at least some of the air coming from the main inlet tube 222 can pass alongside the camera 232 and provide a cooling function.

The camera 232 is supplied with external power and is connected to a signal line by a signal and power supply 236, which in this configuration passes through the top cover 247, into the main input tube 222, down the main input tube 222, and attaching to the camera 132.

The exhaust apparatus 240 includes a main exhaust tube 242 having a vented top cover 247. Attached to the main exhaust tube is a base mounting flange 248 discussed elsewhere. The main exhaust tube 142 is substantially cylindrical, and includes an exhaust port 143, cylindrical side wall 144 (defining a camera hole 146), and a bottom end 145.

The exhaust apparatus 240 accepts air from the inlet apparatus 220 and diverts it either out the camera hole 246, or up alongside the inlet apparatus 220 and out its vented top cover 247, such that said air is vented to the atmosphere.

The air exhausting out the camera hole 246 is supplied at a suitable volume so as to provide a "clearing effect" by blowing away any particulate matter which may tend to accumulate atop or alongside the camera hole 246.

The air path as is follows. The air enters the main inlet apparatus 220, passes down towards the camera module 230, and then passes adjacent to the camera 232, providing a cooling effect. Part of the air then exits the camera hole 246 (see FIG. 5) and into the container interior 6, providing a "hole clearing" function of keeping particulates out of the camera field of view. Another part of the air passes upwardly outside of the main inlet tube 222, but inside the main generally tubular exhaust apparatus 240, until it exits out of the vented top cover 247 of the exhaust apparatus 240, via the exhaust vent holes 243, which have their outlet above the container upper wall 5 and outside the container interior 6. During this path, air flows up the front return groove 238 as it comes out the front of the camera mount 324 (see FIG. 17) and also flows up the rear return groove 239 as it comes out the front of the camera mount 324 (see FIG. 19).

The upper Tri-Clamp assembly 250 allows for the inlet apparatus 220 to be detachably mounted relative to the exhaust apparatus 240, using a conventional tri-clamp configuration in which an upper flange/ferrule is attached to a lower flange/ferrule by use of a clamp connecting the two flanges and sealing an air passageway passing through a hole in each of the two flanges.

Referring now particularly to FIG. 11, the upper flange of the Tri-Clamp assembly 250 is the vented top cover 247 of the exhaust apparatus 240, and the lower flange of the Tri-Clamp assembly 250 is the lower mounting flange 241 (see also FIG. 12). The upper flange of the lower Tri-Clamp assembly 260 is the base mounting flange 248 (which is rigidly attached to the exterior of the main exhaust tube 242), and the lower flange of the Tri-Clamp assembly 260 is a container mounting flange (not shown, which is rigidly attached to the container upper wall 5).

The vented top cover 247 of the exhaust apparatus 240 is "vented", in that it allows air within the main exhaust tube 242 to vent to the atmosphere through exhaust vent holes 243 (see FIG. 11). The extent and volume of said venting may be controlled by a valving supplying the monitoring apparatus. It may also be understood that the top cover supports the upper end of the main inlet tube 222.

Figure 18:
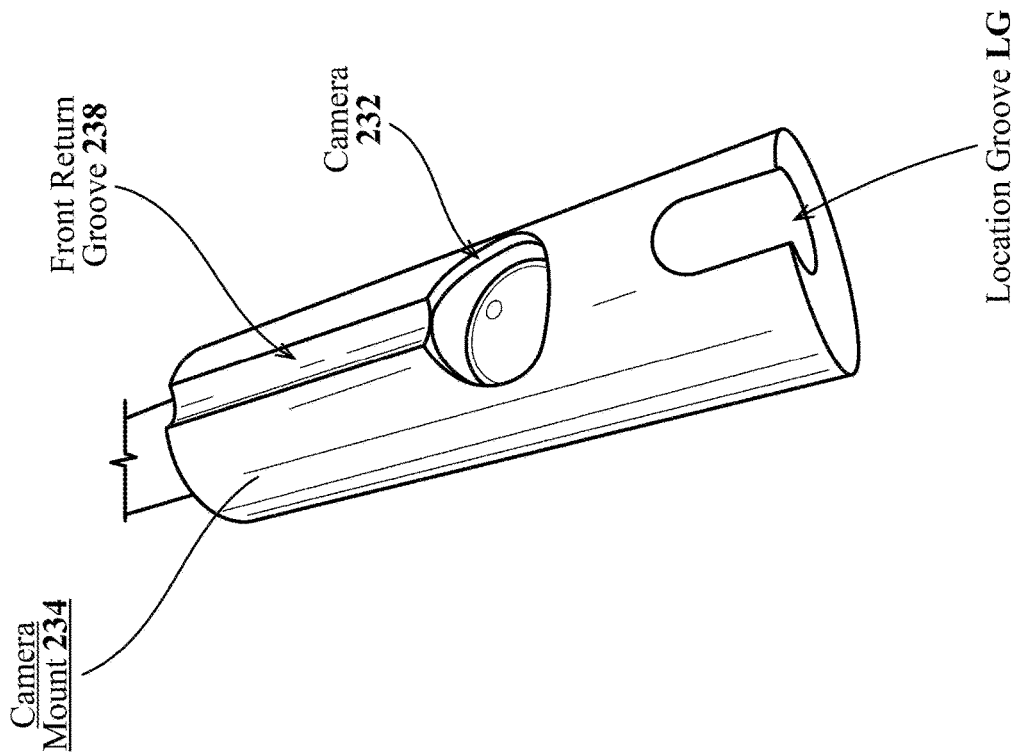
FIG. 18 shows a different detailed pictorial view of a camera mount 234.
Figure 17:
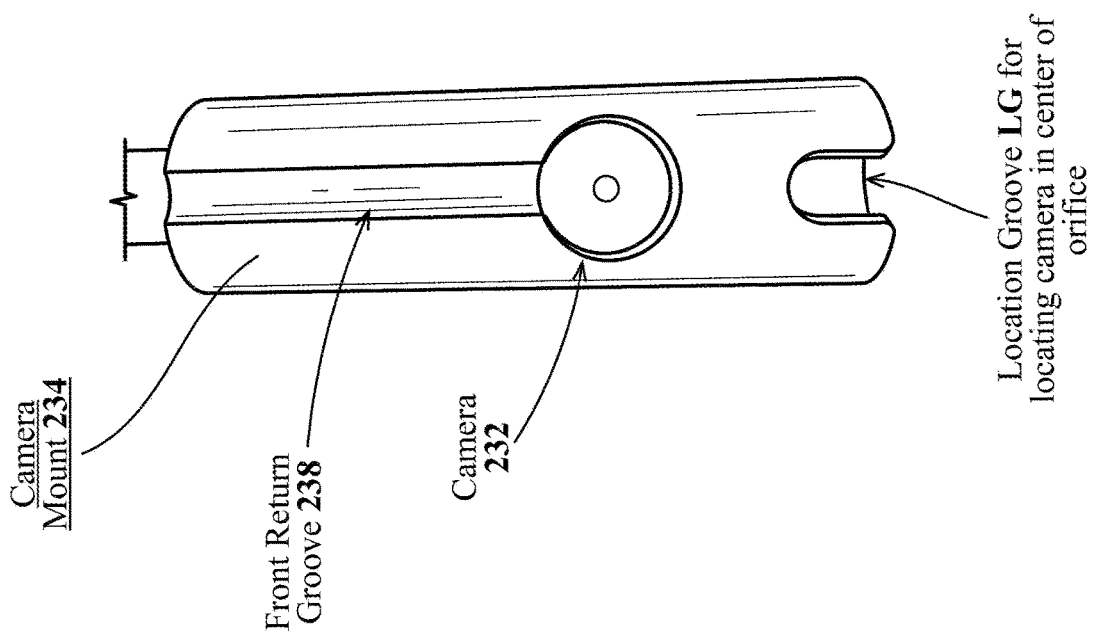
FIG. 17 shows a detailed pictorial view of a camera mount 234.
Figure 19:
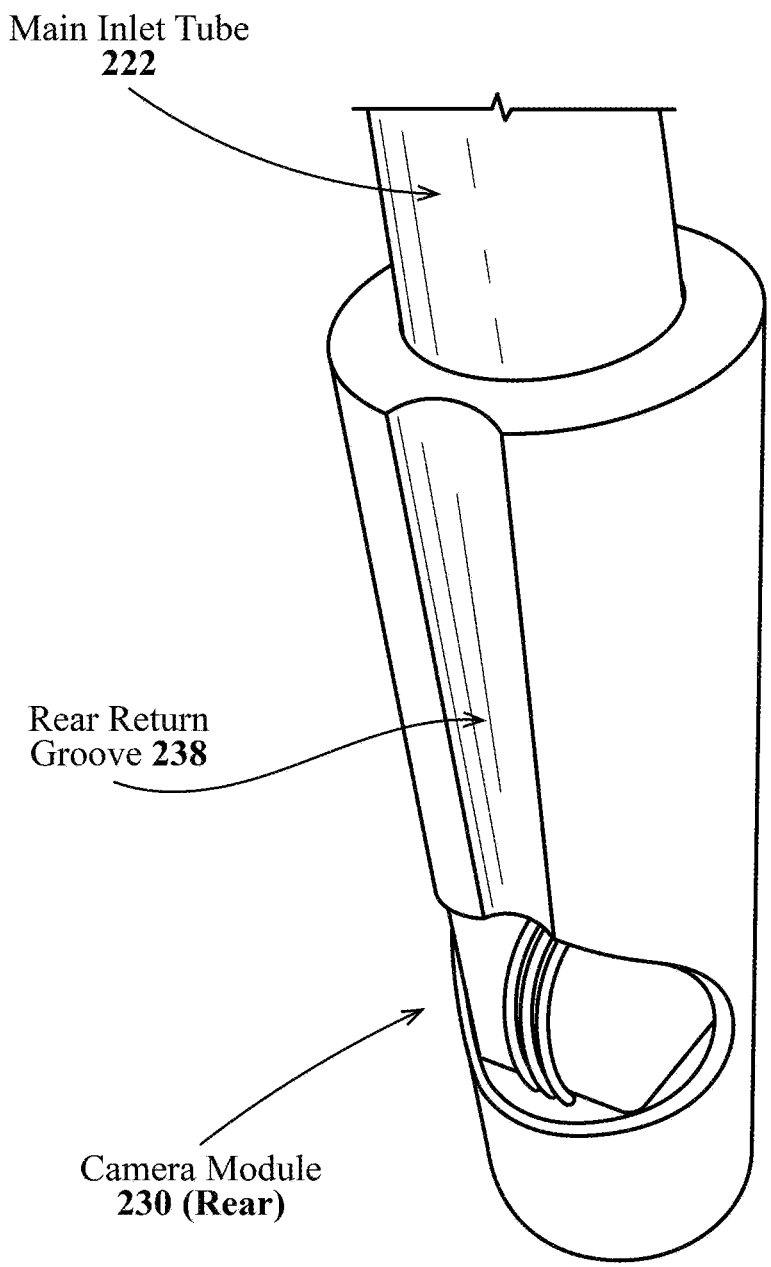
FIG. 19 shows a different detailed pictorial view of a camera mount 234, viewed the side opposite the camera opening side.

Note that there is a location groove LG shown in FIGS. 17-18, which is to allow the use of a locating member, such as a peg, which can engage the wall of the exhaust tube as well as the location groove in the camera mount, so as to provide both stability as well as alignment and proper location of the camera mount (and thus the camera) inside the exhaust apparatus 240.

Embodiment 300

Figure 20:
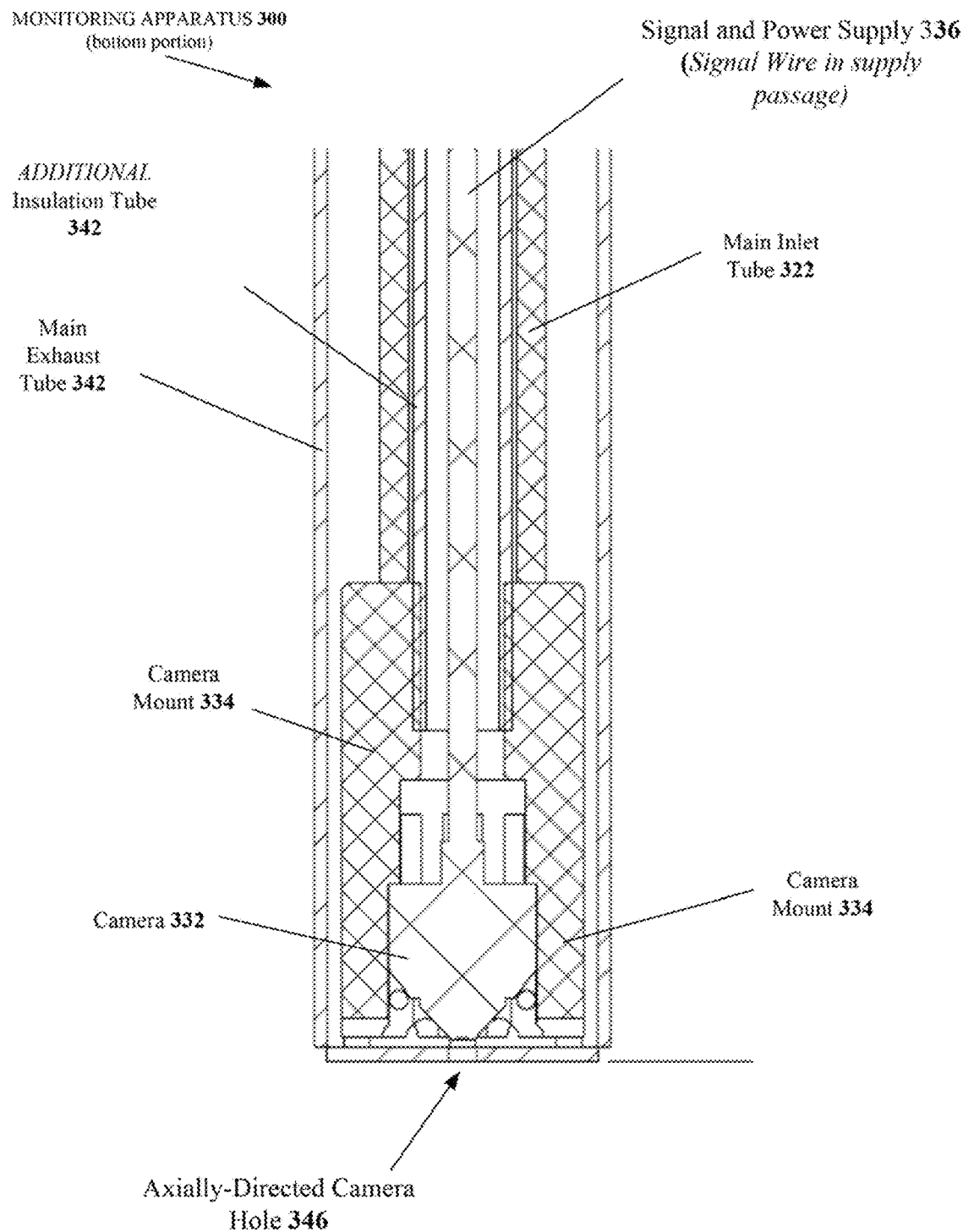
FIG. 20 shows a cross sectional view of an embodiment 300 of according to one aspect of the invention.
Figure 21:
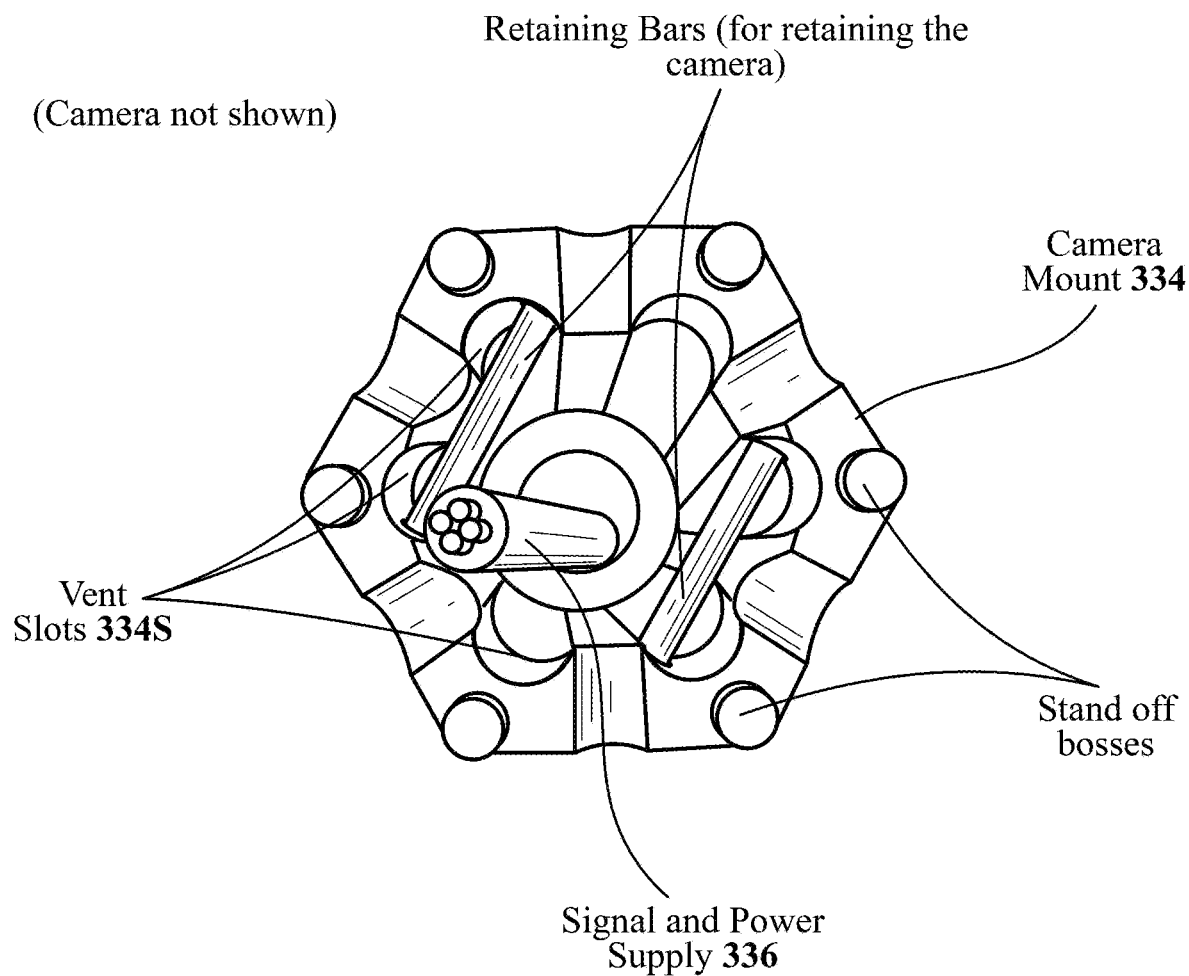
FIG. 21 shows a camera mount 334 as viewed upwardly from its bottom end (assuming it is pointed down); the camera has been removed.

Reference is now made to FIGS. 20 and 21, which illustrate a Monitoring Apparatus 300 embodiment of the invention.

Figure 14:
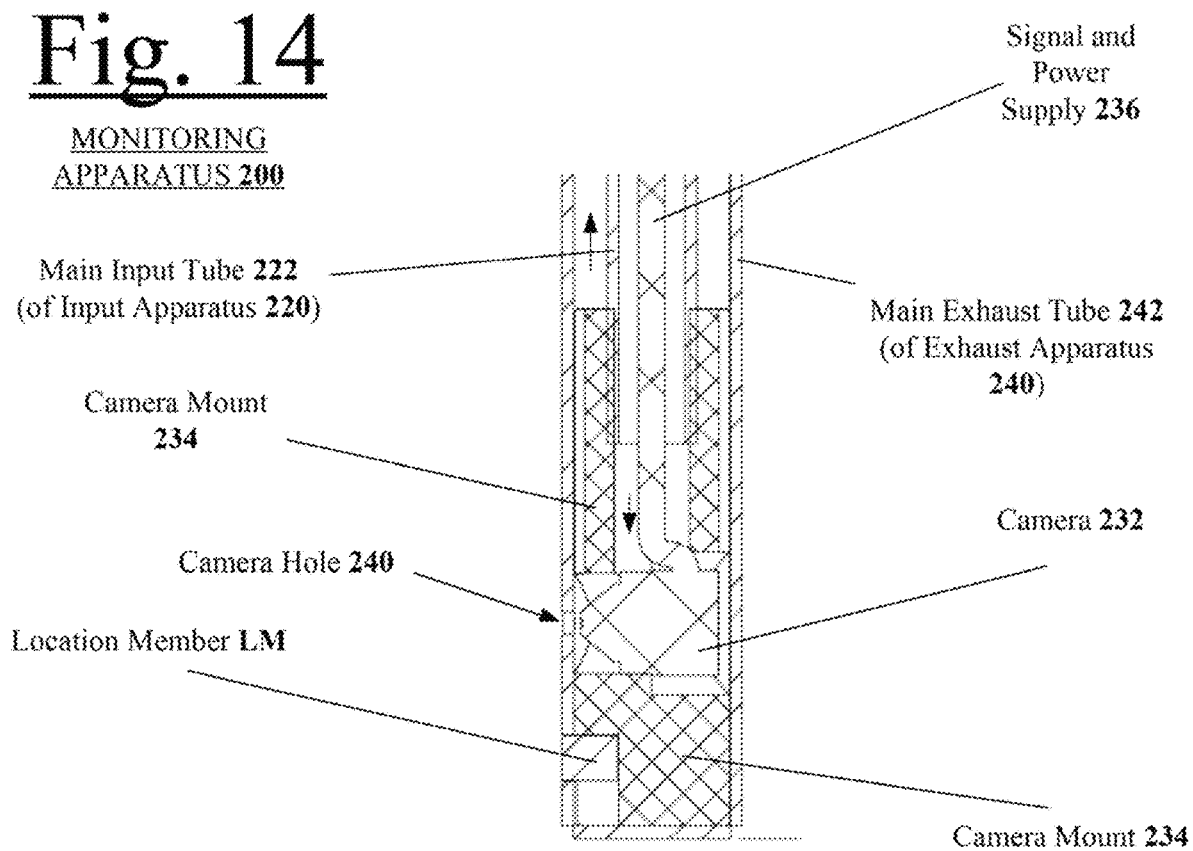
FIG. 14 shows a more detailed view of a portion of that shown in FIG. 12.
Figure 15:
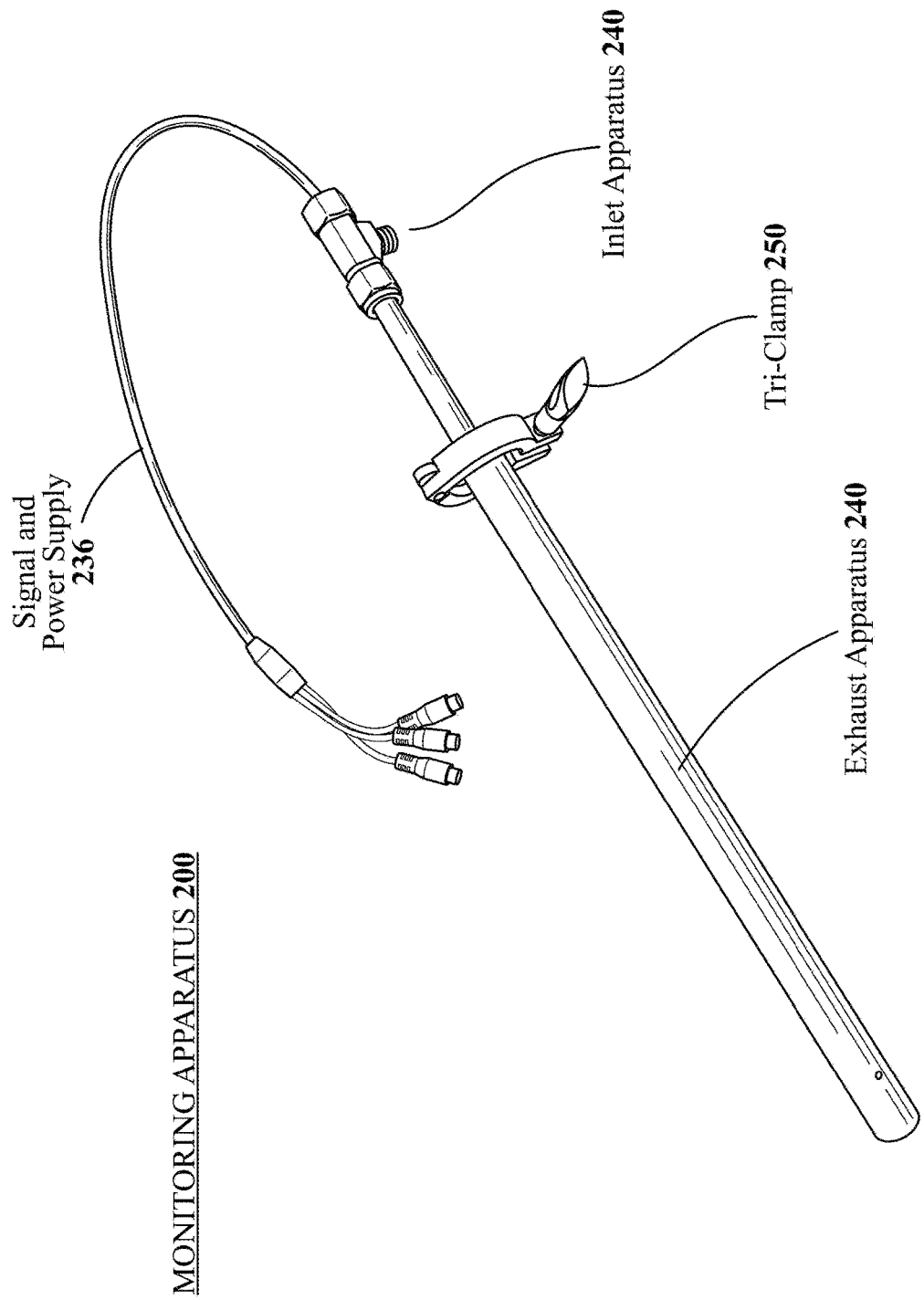
FIG. 15 shows a view of an embodiment 200 positioned atop a table surface.
Figure 16:
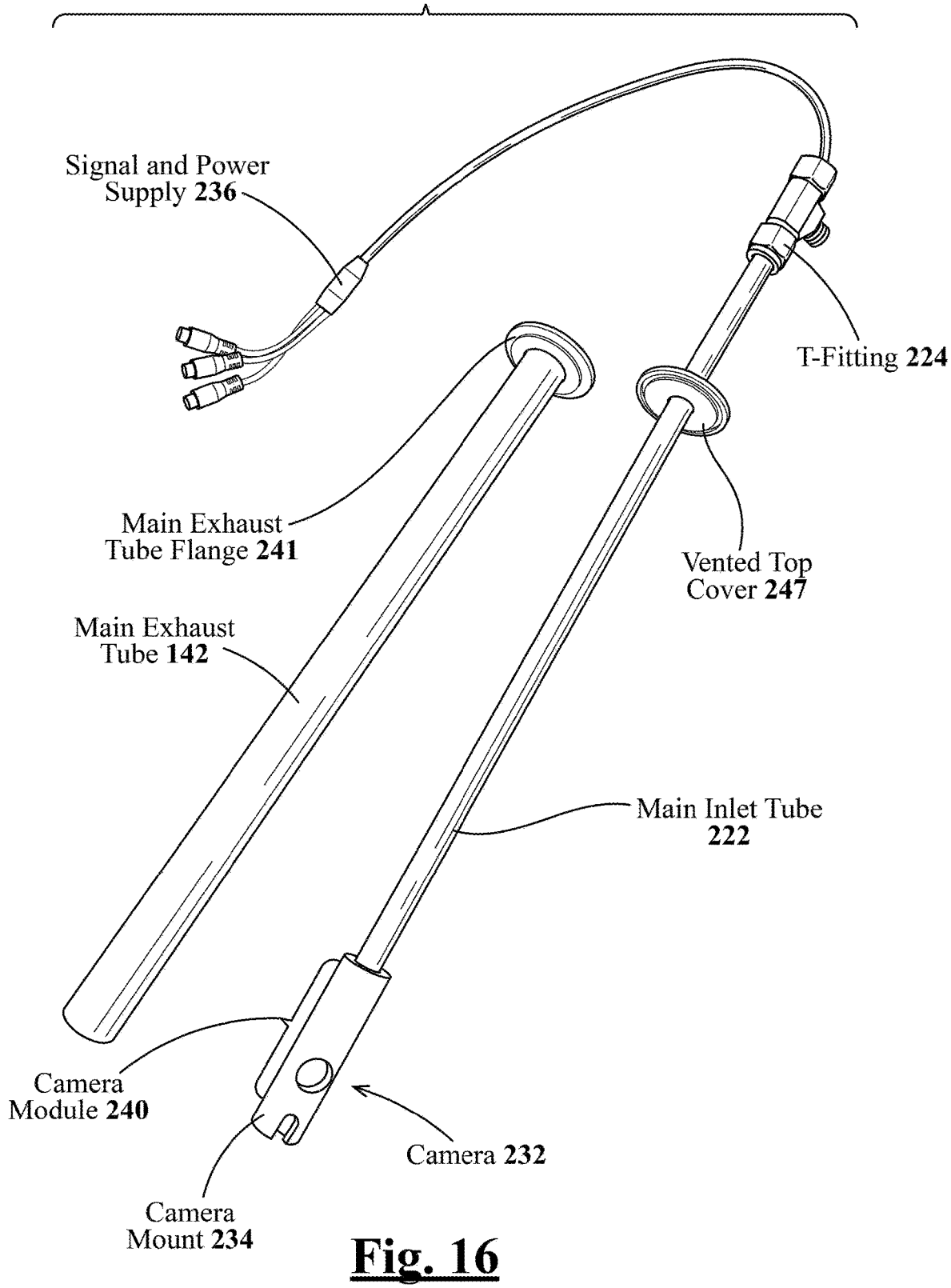
FIG. 16 shows a view of an embodiment 200 positioned atop a table surface, this time with the main exhaust tube separated from the assembly of FIG. 15, and the tri-clamp not shown.

This configuration 300 is similar to the configuration shown in FIG. 14, except that an additional element, an additional insulation tube 342, is provided as shown in FIG. 20. This element is positioned inside the main inlet tube 322, but around the signal and power supply line 336, so as to provide additional insulation and protection for the signal and power supply line 336.

Another difference is that this configuration provides an axially-directed camera, compared to the "radially" directed cameras of the previous configurations. A radially directed camera 332, camera mount 334, and axially-directed hole in the end of the exhaust tube 342 is likewise shown.

FIG. 21 shows the camera mount 334 as viewed upwardly from its bottom end (assuming it is pointed down). A camera is not shown here. Vent slots 334S are provided in the mount 334, so that coming down from the inlet tube can go around the camera, out the vent slots 334S, and then either out the axially-directed hole in the end of the exhaust tube 342, or up to return out of the exhaust tube in a manner similar to previous versions. Stand off bosses may also be provided in order to provide location as needed between the end of the camera mount 334 and the bottom of the exhaust tube. Retaining bars (such as the two shown) may also be used to hold the camera in place in its holder.

Embodiment 400

Figure 22:
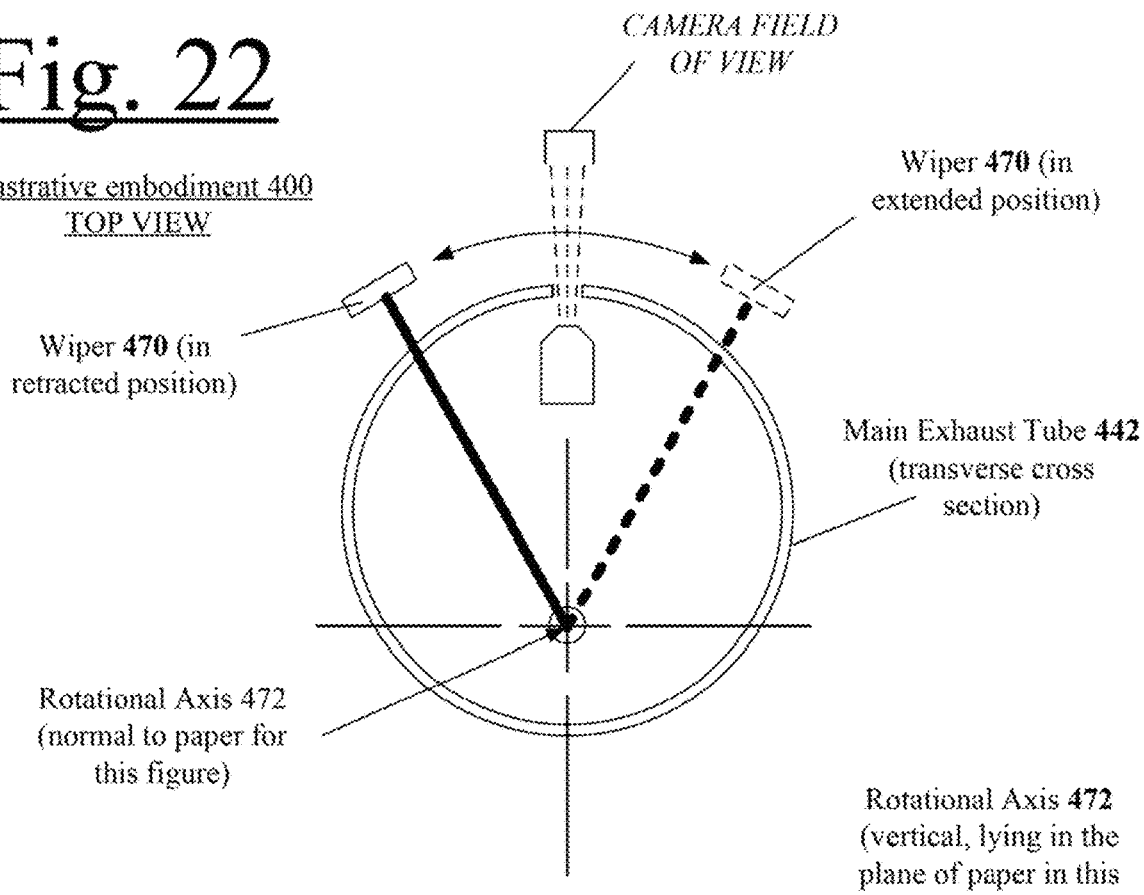
FIG. 22 is an illustrative top down view of an illustrative embodiment 400 according to one aspect of the invention.
Figure 23:
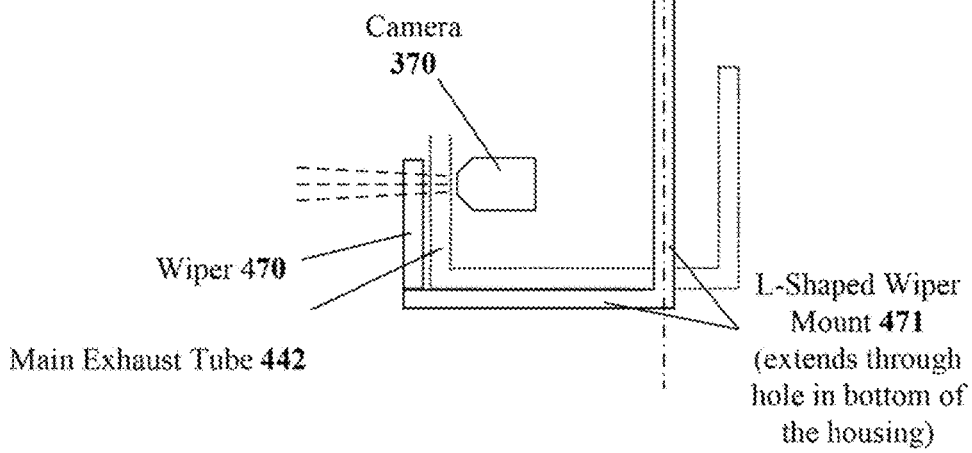
FIG. 23 is an illustrative side view of an illustrative embodiment 400 according to one aspect of the invention.

Reference is now made to FIGS. 22 and 23, which illustrate a Monitoring Apparatus 400 embodiment of the invention. In this embodiment, a "wiper" configuration is used, in which a wiper element 470 is used, having a motion and function somewhat similar to the back and forth arc-like motion of an automobile windshield wiper.

It may be understood that particulate matter can build up in the proximity of the camera field of view, on the outside of the main exhaust tube. While the camera hole is kept open by the airflow flowing through, it may be understood that such a hole may have its field of view obscured as well by the particulate matter. What in effect tends to happen is that as the particulate matter builds up on the outside of the main exhaust tube, a narrow tunnel is developed in the piled-up particulate matter, which reduces the size of the camera field of view.

In order to clear the particulate matter from around the camera hole, the wiper 470 is provided. This wiper, which may take a variety of shapes and sizes, is configured to pass across, but not to contact, the hole or the exhaust tube 442.

As shown in FIG. 22, the wiper 470 moves periodically across the front of the camera hole, not touching it, but coming close enough to knock off a suitable amount of built-up particulate matter. In the embodiment shown, the wiper 470 moves in an arc-like pattern, said path of movement remaining in a horizontal plane. The rotational axis of the wiper 470 as well as its supporting wiper mount.

The wiper wipes back and forth across the field of view of the camera, similar to a conventional auto windshield wiper. The wiper is supported by an L-shaped wiper mount 471 which is rotatably mounted about a substantially vertical axis 472. As the rotational axis of the wiper 470 is greater than the radius of the cross section of the exhaust tube 442, the wiper moves in an arc which has a radius larger than the radius of the exhaust tube 442.

Embodiment 500

Figure 24:
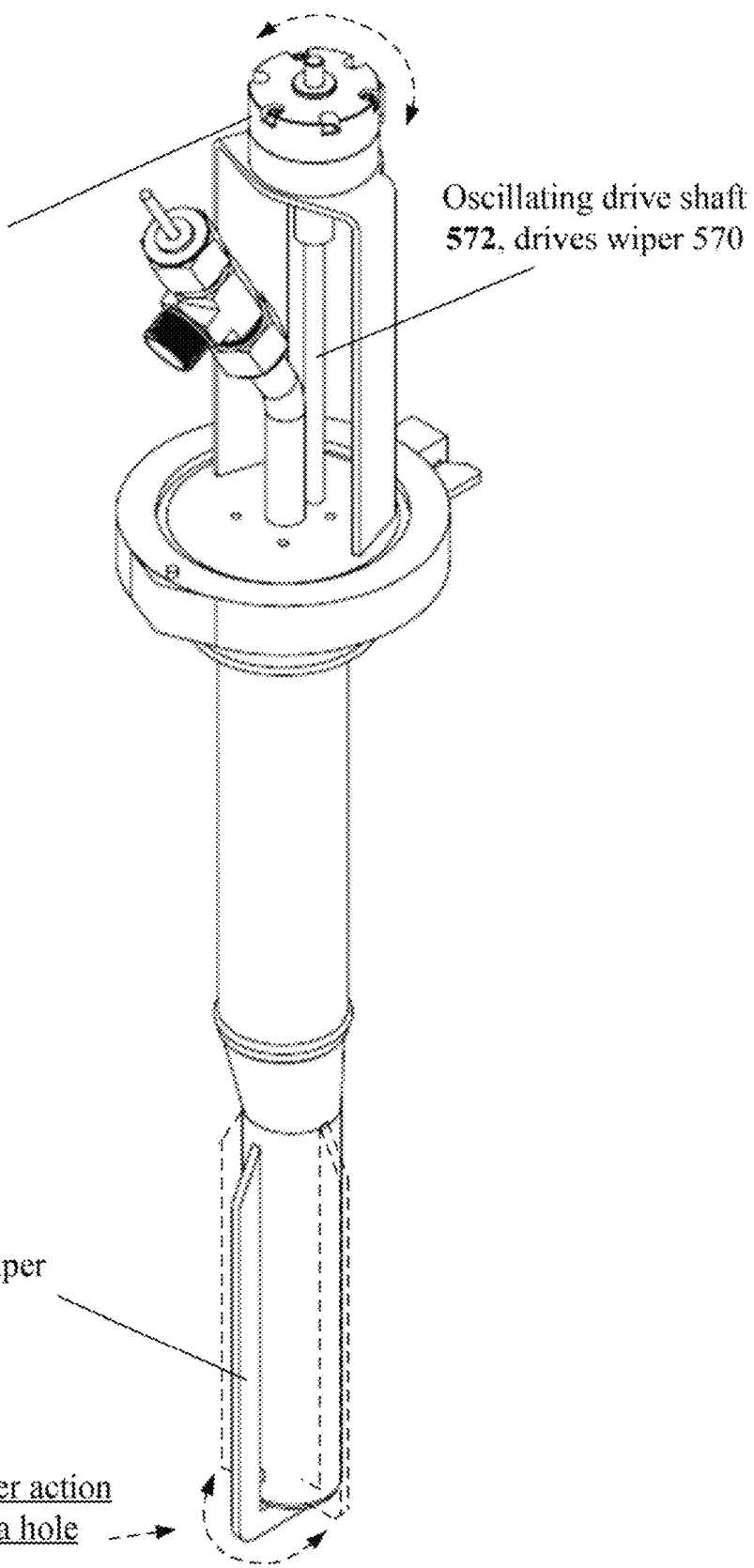
FIG. 24 is a pictorial view of an embodiment 500 according to one aspect of the invention.
Figure 25:
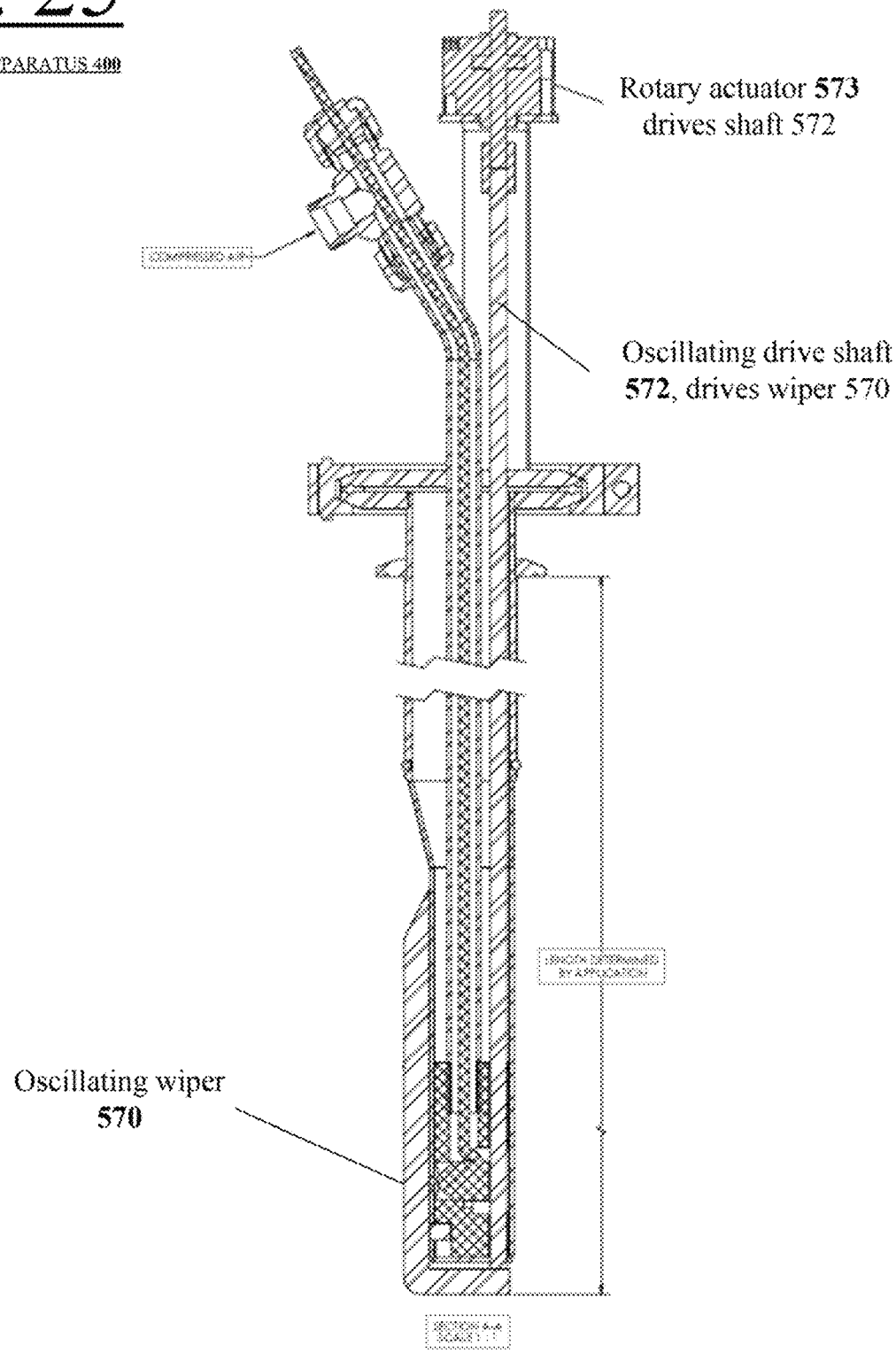
FIG. 25 shows a cross sectional view of that shown in FIG. 24, as viewed along the cross section shown along A-A in FIG. 26.
Figure 26:
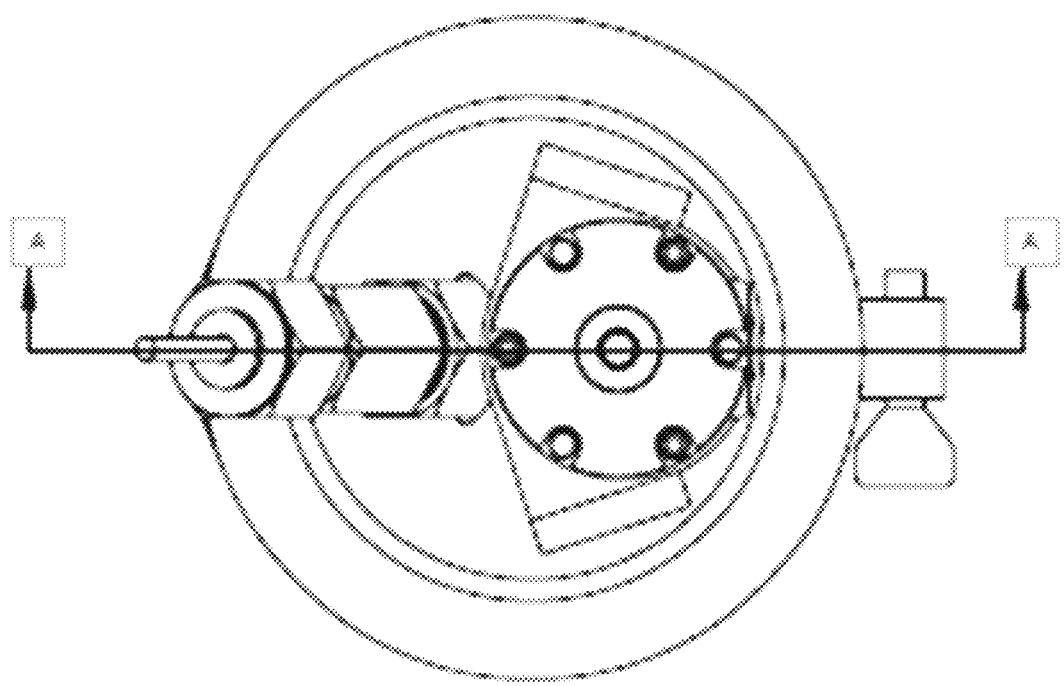
FIG. 26 shows a top view of that shown in FIG. 24.

FIGS. 24-26 show a monitoring apparatus 500 showing the use of an oscillating wiper 570 which periodically oscillates across the path of a camera hole, and is driven by a vertical, periodically oscillating vertical drive shaft 572, which is itself driven by a vertical, periodically oscillating rotary actuator 573, which itself is driven by a suitable means known in the art. All rotation is substantially about the longitudinal axis of the vertical drive shaft 572.

Controls

The camera is controlled by solenoids and a pressure regulator to ensure that the air is on and enough flow is present to the camera. A suitable control panel (not shown) also houses the power and all inputs and outputs to and from the camera.

Pressurized Air Supply

As noted above, the air supplied to the various apparatuses is compressed air of a conventional type. In one configuration, the air is supplied at 80 psi, at a flow rate of approximately 5 cfm.

The camera hole, aka orifice, is approximately 1/16" in diameter. The air supply volume is more important for cooling than for purging, which is largely dependent on temperature of the chamber and length of the protrusion into the chamber. As long as the camera housing is about 10 psi the orifice should stay adequately purged, however it is best to adjust the settings based on observations of particular application than on theory alone.

Materials and Types

The materials used may be selected as found suitable by a competent designer; in one configuration the inlet and outlet tubes are stainless steel.

The cameras can be off the shelf cameras such as but not limited to a CNDST CCTV DST-240P1 Mini Spy Pinhole Security Camera.

CONCLUSION

Various modifications and variations can be made in the present invention without departing from the spirit or scope of the invention.

From the foregoing, it will be seen that this invention is one well adapted to obtain all the ends and objects herein set forth, together with other advantages which are obvious, and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for monitoring the inside of a drying enclosure, said drying enclosure having an environment including suspended particulate matter suspended in air at a first air pressure, said device comprising:
   A) a camera enclosure configured to be placed at least partially within said drying enclosure, said camera enclosure comprising at least one or more containing walls, and also comprising a camera mount,
   said walls combining to define an inlet port to accept air into said camera enclosure at a second air pressure,
   said walls also combining to define an internal camera assembly cavity configured to contain and maintain air therein at said second air pressure being higher than said first air pressure,
   said walls also combining to define a camera viewing port configured to allow for a flow of air out of said camera assembly cavity and into said drying enclosure, when said air within said camera enclosure is at said second air pressure,
   said camera mount being within said camera enclosure; and
   B) a camera assembly including a viewing lens directed along a viewing axis and configured to view a viewing field,
   said camera assembly being mounted relative to said camera mount of said camera enclosure such that said viewing axis extends through said camera viewing port of said camera enclosure, and said viewing field includes at least a portion of said inside of said drying enclosure,
   said camera enclosure and said camera assembly connected and configured such that air within said camera assembly cavity at said second air pressure may exit said camera assembly cavity through said camera viewing port, thus discouraging particulate matter from obstructing said camera viewing port and from obstructing said viewing field of said camera assembly.

2. The device for monitoring the inside of a drying enclosure as set forth in claim 1, wherein said camera enclosure at least partially defines a passageway configured to allow for said air contained within said camera assembly cavity at said second air pressure to move along a path to provide a cooling effect for said camera.

3. The device for monitoring the inside of a drying enclosure as set forth in claim 1, wherein said camera assembly further comprises a signal line for transmitting signal from said camera to a remote receiving location,
   wherein said camera assembly further comprises a power supply for providing power to said camera assembly from a remote location, and
   wherein said camera enclosure at least partially defines a passageway configured to allow for said air contained within said camera assembly cavity at said second air pressure to move along a path to providing cooling of one of said signal line and power supply.

4. The device for monitoring the inside of a drying enclosure as set forth in claim 1, wherein said inlet port of said camera enclosure is configured to be attached to a high air pressure line providing air at said second air pressure.

5. The device for monitoring the inside of a drying enclosure as set forth in claim 1, wherein said inlet port of said camera enclosure is configured to be attached to a high air pressure pump providing air at said second air pressure.

6. The device for monitoring the inside of a drying enclosure as set forth in claim 1, further comprising a high air pressure pump providing air at said second air pressure, and wherein said inlet port of said camera enclosure is attached to a high air pressure pump providing air at said second air pressure.

7. The device for monitoring the inside of a drying enclosure as set forth in claim 1, wherein said camera enclosure at least partially defines a passageway configured to allow for said air contained within said camera assembly cavity at said second air pressure to move along a path to exit said camera enclosure at a location separate from that of said camera viewing port.

8. The device for monitoring the inside of a drying enclosure as set forth in claim 1, wherein said camera enclosure at least partially defines a passageway configured to allow for said air contained within said camera assembly cavity at said second air pressure to move along a path to exit said camera enclosure at a location separate from that of said camera viewing port,
   said passageway provided by the use of two concentric tube assemblies, an inner inlet tube assembly and an outer exhaust tube assembly, in which air first passes through said inlet tube assembly in one direction, and then exhausted through said exhaust tube assembly along a second, opposing direction, and
   wherein said camera mount is mounted relative to said inlet tube assembly.

9. A device for monitoring the inside of a drying enclosure, said drying enclosure having an environment including suspended particulate matter suspended in air at a first air pressure, said device comprising:
   A) a camera enclosure configured to be placed at least partially within said drying enclosure, said camera enclosure comprising at least one or more containing walls, and also comprising a camera mount,
   said walls combining to define an inlet port to accept air into said camera enclosure at a second air pressure,
   said walls also combining to define an internal camera assembly cavity configured to contain air therein at said second air pressure being higher than said first air pressure,
   said walls also combining to define a camera viewing port configured to allow for a flow of air out of said camera assembly cavity and into said drying enclosure, when said air within said camera enclosure is at said second air pressure,
   said camera mount being within said camera enclosure;
   B) a camera assembly including a viewing lens directed along a viewing axis and configured to view a viewing field,
   said camera assembly being mounted relative to said camera mount of said camera enclosure such that said viewing axis extends through said camera viewing port of said camera enclosure, and said viewing field includes at least a portion of said inside of said drying enclosure,
   said camera enclosure and said camera assembly connected and configured such that air contained within said camera assembly cavity at said second air pressure may exit said camera assembly cavity through said camera viewing port, thus discouraging particulate matter from obstructing said camera viewing port and from obstructing said viewing field of said camera assembly; and C) a wiper assembly including a wiper blade configured to wipe particulate matter from the outside of said camera enclosure proximate the camera viewing port to assist in clearing particulate matter from said camera viewing field.

10. A method for monitoring the inside of a drying enclosure, said drying enclosure having an environment including suspended particulate matter suspended in air at a first air pressure, said method comprising:
   A) providing a camera enclosure for containing a camera therein, said camera enclosure defining an internal camera assembly cavity configured to contain air therein at a second air pressure being higher than said first air pressure;
   B) positioning a camera assembly within said camera assembly cavity, such that said camera lens includes a field of view passing through said camera viewing port and into said inside of said drying enclosure, such that said camera can monitor at least part of said drying enclosure; and
   C) introducing air into said camera enclosure at a pressure higher than said first air pressure,
   such that said camera assembly cavity is maintained at said second air pressure such that at least a part of said air introduced into said camera enclosure subsequently passes out of said camera viewing port,
   said flow out of said viewing port tending to discourage accumulation of particulate matter within said viewing port and thus tending to clear said particulate matter from said field of view of said camera.

11. The method for monitoring the inside of a drying enclosure as set forth in claim 10, wherein said camera enclosure at least partially defined a passageway configured to allow for cooling of the camera.

12. The method for monitoring the inside of a drying enclosure as set forth in claim 10, wherein said camera assembly further comprises a signal line for transmitting signal from said camera to a remote receiving location,
   wherein said camera assembly further comprises a power supply for providing power to said camera assembly from a remote location, and
   wherein said camera enclosure at least partially defines a passageway configured to allow for said air contained within said camera assembly cavity at said second air pressure to move along a path to providing cooling of one of said signal line and power supply.

13. The method for monitoring the inside of a drying enclosure as set forth in claim 10, wherein said inlet port of said camera enclosure is configured to be attached to a high air pressure line providing air at said second air pressure.

14. The method for monitoring the inside of a drying enclosure as set forth in claim 10, wherein said inlet port of said camera enclosure is configured to be attached to a high air pressure pump providing air at said second air pressure.

15. The method for monitoring the inside of a drying enclosure as set forth in claim 10, further comprising a high air pressure pump providing air at said second air pressure, and wherein said inlet port of said camera enclosure is attached to a high air pressure pump providing air at said second air pressure.

16. The method for monitoring the inside of a drying enclosure as set forth in claim 10, wherein said camera enclosure at least partially defines a passageway configured to allow for said air contained within said camera assembly cavity at said second air pressure to move along a path to exit said camera enclosure at a location separate from that of said camera viewing port.

17. The method for monitoring the inside of a drying enclosure as set forth in claim 10,
   wherein said camera enclosure further comprises a wiper assembly including a wiper blade configured to wipe particulate matter from the outside of said camera enclosure proximate the camera viewing port to assist in clearing particulate matter from said camera viewing field, and
   wherein said method further comprises operation of said wiper assembly such that its wiper blade wipes particulate matter from the outside of said camera.

18. The method for monitoring the inside of a drying enclosure as set forth in claim 10, wherein said camera enclosure at least partially defines a passageway configured to allow for said air contained within said camera assembly cavity at said second air pressure to move along a path to exit said camera enclosure at a location separate from that of said camera viewing port,
   said passageway provided by the use of two concentric tube assemblies, an inner inlet tube assembly and an outer exhaust tube assembly, in which air first passes through said inlet tube assembly in one direction, and then exhausted through said exhaust tube assembly along a second, opposing direction,
   wherein said camera mount is mounted relative to said inlet tube assembly, and
   wherein step C causes air to first pass through said inlet tube assembly in said one direction, and then be exhausted through said exhaust tube assembly along said second, opposing direction.

19. The method for monitoring the inside of a drying enclosure as set forth in claim 10,
   wherein said method further comprises viewing and monitoring said inside of said drying enclosure with said camera.

* * * * *